US012643082B2

(12) United States Patent
Lee et al.

(10) Patent No.: US 12,643,082 B2
(45) Date of Patent: Jun. 2, 2026

(54) THREE DIMENSIONAL MULTIPHASIC STRUCTURES VIA VAPORIZATION INDUCED PHASE SEPARATION (VIPS)

(71) Applicant: The Trustees of the University of Pennsylvania, Philadelphia, PA (US)

(72) Inventors: Daeyeon Lee, Wynnewood, PA (US); Kathleen J Stebe, Penn Valley, PA (US); Tiancheng Wang, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 209 days.

(21) Appl. No.: 18/465,221

(22) Filed: Sep. 12, 2023

(65) Prior Publication Data

US 2024/0001320 A1    Jan. 4, 2024

Related U.S. Application Data

(62) Division of application No. 17/093,720, filed on Nov. 10, 2020, now Pat. No. 11,786,879.

(60) Provisional application No. 62/933,606, filed on Nov. 11, 2019.

(51) Int. Cl.
| | |
|---|---|
| *B01J 13/00* | (2006.01) |
| *B01F 23/40* | (2022.01) |
| *B01F 23/41* | (2022.01) |
| *B01F 23/80* | (2022.01) |
| *B33Y 10/00* | (2015.01) |
| *B33Y 70/10* | (2020.01) |
| *B33Y 80/00* | (2015.01) |

(52) U.S. Cl.
CPC .......... *B01J 13/0065* (2013.01); *B01F 23/41* (2022.01); *B01F 23/806* (2022.01); *B01J 13/0069* (2013.01); *B33Y 10/00* (2014.12); *B33Y 70/10* (2020.01); *B33Y 80/00* (2014.12); *B01F 23/4146* (2022.01); *B01F 23/48* (2022.01)

(58) Field of Classification Search
None
See application file for complete search history.

(56) References Cited

U.S. PATENT DOCUMENTS

| | | | |
|---|---|---|---|
| 4,956,289 A | 9/1990 | Wrasidlo et al. | |
| 11,220,597 B2 | 1/2022 | Haase et al. | |
| 2002/0155208 A1 | 10/2002 | Benjamins et al. | |
| 2005/0064431 A1 | 3/2005 | Leon et al. | |

(Continued)

OTHER PUBLICATIONS

Sanz et al., "Colloidal Gels Assembled via a Temporary Interfacial Scaffold," Phys. Rev. Lett., 2009, vol. 103, No. 25, 255502.

(Continued)

*Primary Examiner* — Colin W. Slifka
(74) *Attorney, Agent, or Firm* — BakerHostetler

(57) ABSTRACT

This disclosure demonstrates a new method to produce three dimensional multiphasic structures, including bijels, via vapor-induced phase separation (VIPS). In VIPS, the evaporation of the co-solvent from a ternary mixture of oil, water and ethanol, induces phase separation. Particles present in the mixture attach to the interface and arrest the phase separation between water and oil. VIPS enables, inter alia, the fabrication of films and coatings via spreading or spraying particle-laden suspension onto a surface without the need for an outer aqueous phase.

20 Claims, 29 Drawing Sheets
(29 of 29 Drawing Sheet(s) Filed in Color)

VIPs: Vaporization Induced Phase Separation

(56) References Cited

U.S. PATENT DOCUMENTS

| | | |
|---|---|---|
| 2008/0125500 A1 | 5/2008 | Cates et al. |
| 2009/0130755 A1 | 5/2009 | Detamore et al. |
| 2010/0016200 A1 | 1/2010 | Nagare et al. |
| 2012/0071609 A1 | 3/2012 | Savla |
| 2013/0005945 A1 | 1/2013 | Yue et al. |
| 2015/0102265 A1 | 4/2015 | Russell et al. |
| 2018/0127577 A1 | 5/2018 | Haase et al. |

OTHER PUBLICATIONS

Sepehri et al., "Nanostructured Materials for Hydrogen Storage", Advanced Materials Research, Bd., vol. 132, 2010, pp. 137-153.
Soares et al., "Electrical Conductivity in Carbon Black-loaded Polystyrene-polyisoprene Blends. Selective Localization of Carbon Black at the Interface", Polymer Bulletin, (1995), vol. 35, Iss, 1-2, pp. 223-228.
Song et al., "Monodisperse w/w/w/ Double Emulsion Induced by Phase Separation", Langmuir 2012, vol. 28, pp. 12054-12059.
Srivastava et al., "Mesoporous Materials with Zeolite Framework: Remarkable Effect of the Hierarchical Structure for Retardation of Catalyst Deactivation," Chem. Commun., 2006, No. 43, 4489.
Stratford et al., "Colloidal Jamming at Interfaces: A Route to Fluid-Bicontinuous Gels", Science, Sep. 30, 2005, vol. 309, pp. 2198-2202.
Studart et al., "Arrested Coalescence of Particle-Coated Droplets into Nonspherical Supracolloidal Structures," J. Phys. Chem. B, 2009, vol. 113, No. 12, pp. 3914-3919.
Sun et al., "Porous Polymer Catalysts with Hierarchical Structures," Chem. Soc. Rev., 2015, vol. 44, No. 17, pp. 6018-6034.
Tanaka et al., "Monolithic Silica cols. for High-efficiency Chromatographic Separations", Journal of Chromatography A., 965, (2002), pp. 35-49.
Tavacoli et al., "Bicontinuous Emulsions Stabilized by Colloidal Particles (Chapter 6)", Royal Society of Chemistry 2015, pp. 129-168.
Tavacoli et al., "Novel, Robust, and Versatile Bijels of Nitromethane, Ethanediol, and Colloidal Silica: Capsules, Sub-Ten-Micrometer Domains, and Mechanical Properties," Adv. Funct. Mater, 2011, vol. 21, No. 11, pp. 2020-2027.
Torquato et al., "Multifunctional Composites: Optimizing Microstructures for Simultaneous Transport of Heat and Electricity", Physical Review Letters, The American Physical Society, vol. 89, No. 26, Dec. 23, 2002—p. 26601-01-266601-4.
Wang et al., "Co-continuous Composite Materials for Stiffness, Strength, and Energy Dissipation", Advanced Materials, 2011, 23, pp. 1524-1529.
White et al., "Influence of Particle Composition and Thermal Cycling on Bijel Formation," J. Phys.: Condens. Matter, 2008, vol. 20, No. 49, 494223.
Witt et al., "Bijel Reinforcement by Droplet Bridging: A Route to Bicontinuous Materials with Large Domains", Soft Matter, 2013, vol. 9, pp. 6773-6780.
Witt et al., "Microstructural Tunability of Co-Continuous Bijel-Derived Electrodes to Provide High Energy and Power Densities," J. Mater. Chem. A, 2016, vol. 4, No. 3, pp. 1000-1007.
Yow et al., "Formation of Liquid Core-polymer Shell Microcapsules", Soft Matter, 2006, vol. 2, pp. 940-949.
Yuan et al., "Insights into Hierarchically Meso-macroporous Structured Materials", J. Mater. Chem., 2006, vol. 16, pp. 663-677.
Zapata et al., "Hydrophobic Zeolites for Biofuel Upgrading Reactions at the Liquid-liquid interface in Water/oil Emulsions", J. Am. Chem. Soc., 2012, vol. 134, pp. 8570-8578.
Zhang et al., "Compartmentalized Droplets for Continuous Flow Liquid-Liquid Interface Catalysis," J. Am. Chem. Soc., 2016, vol. 138, No. 32, pp. 10173-10183.
Zhang et al., "Micrometer-Scale Mixing with Pickering Emulsions: Biphasic Reactions without Stirring," ChemSusChem., 2014, vol. 7, No. 2, pp. 391-396.

"Highlands and Drylands: Mountains, A Source of Resilience in Arid Regions", the Food and Agriculture Organization of the United Nations and Centre for Development and Environment of the University of Bern, 2001, 115 pages.
Aveyard et al., "Emulsions Stabilised Solely by Colloidal Particles," Advances in Colloid and Interface Science, 2003, pp. 100-102, 503-546.
Awala et al., "Template-free Nanosized Faujasite-type Zeolites", Nature Materials, vol. 14, Apr. 2015, pp. 447-451.
Bai et al., "Dynamics and Rheology of Nonpolar Bijels," Soft Matter, 2015, vol. 11, No. 26, pp. 5282-5293.
Berthiaum et al., "Tissue Engineering and Regenerative Medicine: History, Progress and Challenges", Annu. Rev. Chem, Biomol. Eng., 2011, vol. 2, pp. 403-430.
Boon et al., "Blue Energy from Ion Adsorption and Electrode Charging in Sea- and -River Water", 2011 Molecular Physics, vol. 109, 14 pages.
Bray A.J., "Theory of Phase Ordering Kinetics", Advances in Physics, vol. 51, 2008, 85 pages.
Brugger et al., "Microgels as Stimuli-Responsive Stabilizers for Emulsions", Langmuir, 2008, vol. 24, pp. 12202-12208.
Cai et al., "Bijels formed by direct mixing," Soft matter, 2017, vol. 13, No. 28, pp. 4824-4829.
Cates et al., "Bijels: A New Class of Soft Materials", Soft Matter, 2008, vol. 4, pp. 2132-2138.
Chai et al., "Ordered Porous Carbons with Tunable Pore Sizes as Catalyst Supports in Direct Methanol Fuel Cell", J. Phys. Chem. B, 2004, vol. 108, pp. 7074-7079.
Chen et al., "Multifunctionality of Three-dimensional Self-Assembled Composite Structure", Scripta Materials, 61, 2009, pp. 52-55.
Chevalier et al., "Emulsions Stabilized with Solid Nanoparticles: Pickering Emulsions," Colloids and Surfaces A: Physicochemical and Engineering Aspects, 2013, vol. 439, pp. 23-34.
Chung T., "Fabrication of Hollow-Fiber Membranes by Phase Inversion", Advanced Membrane Technology and Applications, 2008, pp. 821-839.
Crossley et al., "Solid Nanoparticles That Catalyze Biofuel Upgrade Reactions at the Water/Oil Interface," Science, 2010, vol. 327, No. 5961, pp. 68-72.
Destribat et al., "Emulsions Stabilized by Whey Protein Microgel Particles: Towards Food-trade Pickering Emulsions", Soft Mater, 2014, vol. 10, pp. 6941-6954.
Di Vitantonio et al., "Robust Bijels for Reactive Separation via Silica-Reinforced Nanoparticle Layers," ACS Nano, 2019, vol. 13, No. 1, 26-31.
Ding et al., "Metallic Mesoporous Nanocomposites for Electrocatalysis", J. Am. Chem. Soc., 2004, vol. 126, pp. 6876-6877.
Dong et al., "Bioinspired Electrospun Knotted Microfibers for Fog Harvesting", ChemPhysChem 2012, vol. 13, pp. 1153-1156.
Galiano et al., "UV-LED Induced Bicontinuous Microemulsions Polymerisation for Surface Modification of Commercial Membranes—Enhancing the Antifouling Properties," Separation and Purification Technology, 2018, vol. 194, pp. 149-160.
Greiner et al., "Electrospinning: A Fascinating Method for the Preparation of Ultrathin Fibers", Angew. Chem. Int. Ed., 2007, vol. 46, pp. 5670-5703.
Gubbels et al., Kinetic and Thermodynamic Control of the Selective Localization of Carbon Black at the Interface of Immiscible Polymer Blends, Chem. Mater., 1998, vol. 10, pp. 1227-1235.
Guillen et al., "Preparation and Characterization of Membranes Formed by Nonsolvent Induced Phase Separation: A Review", Industrial & Engineering Chemistry Research, 2011, vol. 50, pp. 3798-3817.
Haase et al., "Continuous Fabrication of Hierarchical and Asymmetric Bijel Microparticles, Fibers, and Membranes by Solvent Transfer-Induced Phase Separation (STRIPS)," Adv. Mater., 2015, vol. 27, No. 44, pp. 7065-7071.
Haase et al., "Development of Nanoparticle Stabilized Polymer Nanocontainers with High Content of the Encapsulated Active Agent and Their Application in Water-Borne Anticorrosive Coatings," Adv. Mater., 2012, vol. 24, No. 18, pp. 2429-2435.

(56)                    References Cited

OTHER PUBLICATIONS

Haase et al., "Multifunctional Nanocomposite Hollow Fiber Membranes by Solvent Transfer Induced Phase Separation," Nat. Commun., 2017, vol. 8, No. 1, 1234.

Haase et al., "Tailoring of High-Order Multiple Emulsions by the Liquid-Liquid Phase Separation of Ternary Mixtures," Angew. Chem. Int. Ed., 2014, vol. 53, No. 44, pp. 11987-11991.

Haase, MF et al., In Situ Mechanical Testing of Nanostructured Bijel Fibers, ACS Nano. May 31, 2016. vol. 10, No. 6; entire document.

Herzig et al., "Bicontinuous Emulsions Stabilized Solely by Colloidal Particles", Nature Materials, vol. 6, No. 12, 2007, pp. 966-971.

Herzig et al., "Bicontinuous Emulsions Stabilized Solely by Colloidal Particles," Nature Mater, 2007, vol. 6, No. 12, pp. 966-971.

Hong et al., "Preparation, Bioactivity, and Drug Release of Hierarchical Nanoporous Bioactive Glass Ultrathin Fibers," Adv. Mater., 2010, vol. 22, No. 6, pp. 754-758.

Hu et al., "Hierarchical Structure of Electrospun Composite Fibers for Long-Term Controlled Drug Release Carriers," Advanced Healthcare Materials, 2012, vol. 1, No. 6, pp. 809-814.

Huang et al., "Bicontinuous structured liquids with sub-micro-metre domains using nanoparticle surfactants," Nature nanotech-nology, 2017, vol. 12, No. 11, pp. 1060-1064.

International Preliminary Report on Patentability for International Application No. PCT/US2016/035031, dated Dec. 5, 2017, 9 pages.

International Search Report and Written Opinion for International Application No. PCT/US2016/035031, dated Oct. 6, 2016, 11 pages.

Jansen et al., "From Bijels to Pickering Emulsions: A Lattice Boltzmann Study," Phys. Rev., 2011, vol. E 83, No. 4, 046707.

Jones et al., "High-temperature Nanoporous Ceramic Monolith Prepared from a Polymeric Bicontinuous Microemulsion Template", J. Am. Chem. Soc., 2009, vol. 131, pp. 1676-1677.

Kargar et al., "Investigation into the Potential Ability of Pickering Emulsions (Food Grade Particles) to Enhance the Oxidative Stability of Oil-in-Water Emulsions", Journal of Colloid and Interface Science, vol. 366, (2012), pp. 209-215.

Klemm et al., "Fog as a Fresh-Water Resource: Overview and Perspectives", AMBIO, 2012, vol. 41, pp. 221-234.

Lai et al., "Profiting from Nature: Macroporous Copper with Superior Mechanical Properties", Chem. Communications, 2007, pp. 3547-3549.

Lee et al., "Bicontinuous Macroporous Materials from Bijel Templates," Adv. Mater, 2010, vol. 22, No. 43, pp. 4836-4841.

Lee et al., "Developing Monolithic Nanoporous Gold with Hierarchical Bicontinuity Using Colloidal Bijels," J. Phys. Chem. Lett., 2014, vol. 5, No. 5, pp. 809-812.

Lee et al., "Hierarchically Porous Silver Monoliths from Colloidal Bicontinuous Interfacially Jammed Emulsion Gels," J. Am. Chem. Soc., 2011, No. 133, No. 18, pp. 6945-6947.

Lee et al., Making a Robust interfacial Scaffold: Bijel Rheology and its Link to Processability, Advanced Functional Mater., 2013, vol. 23, pp. 417-423.

Lee et al., Bicontinuous Macroporous Materials from Bijel Templates, Adv. Mater., 2010, 22, 4836-4841.

Martina et al., "Developing Macroporous Bicontinuous Materials as Scaffolds for Tissue Engineering", Biomaterials, vol. 26 (2005), pp. 5609-5616.

Marto et al., "Melatonin-Based Pickering Emulsion for Skin's Photoprotection," Drug Delivery, 2016, No. 23, No. 5, pp. 1594-1607.

McDevitt et al., "Improving Cyclability of ZnO Electrodes through Microstructural Design," ACS Appl. Energy Mater, 2019, No. 2, No. 11, pp. 8107-8117.

Moutos et al., "A Biomimetic Three-dimensional Woven Composite Scaffold for Functional Tissue Engineering of Cartilage", Nature Materials, vol. 6, Feb. 2007, pp. 162-167.

Parlett et al., "Hierarchical Porous Materials: Catalytic Applications," Chem. Soc. Rev., 2013, vol. 42, No. 9, pp. 3876-3893.

Pickering Emulsion    Bicontinuous Particle
stabilized Emulsion
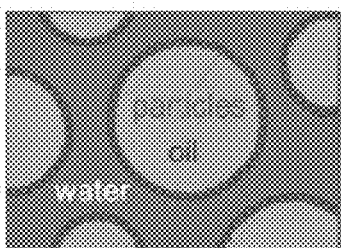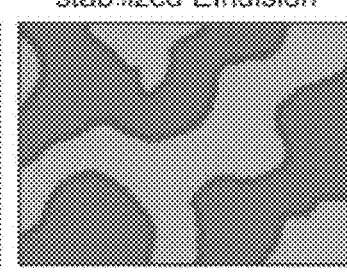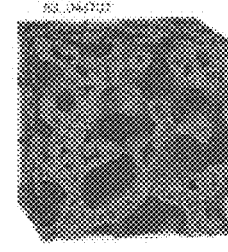
*K. Stratford et al.*, Science, 2005, 309, 2198
PRIOR ART
FIG. 6

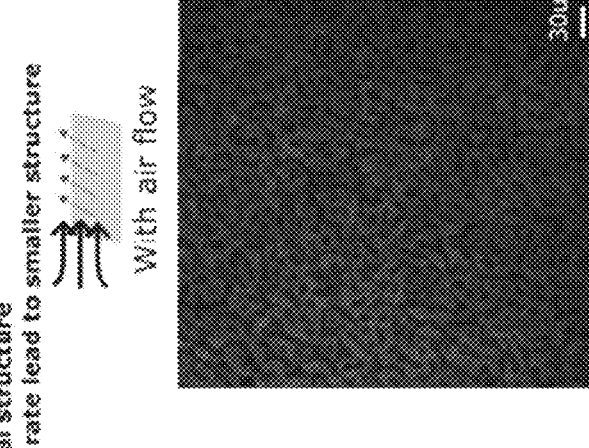
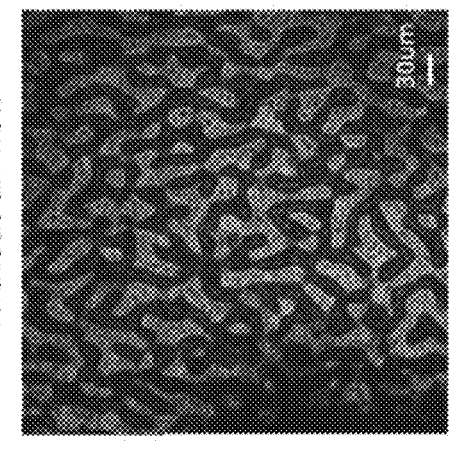
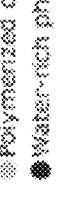
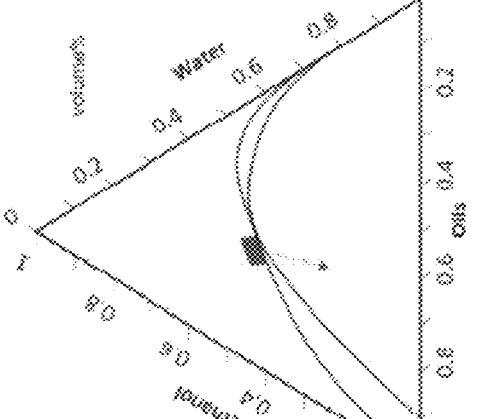
FIG. 9

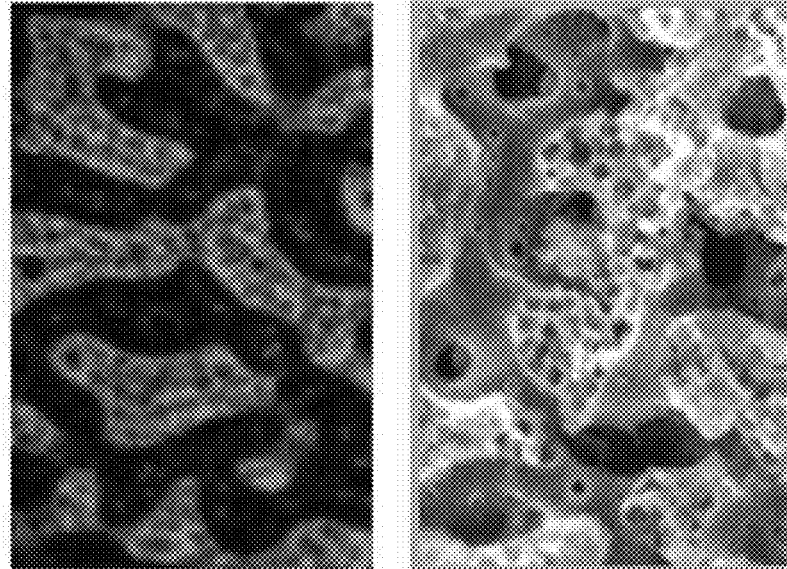
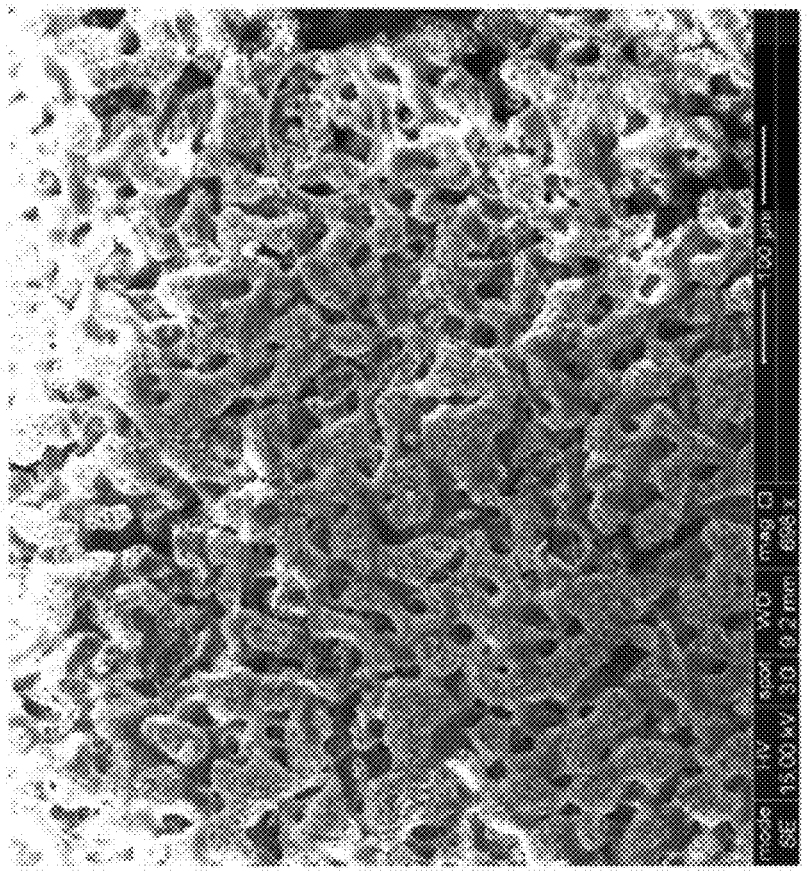
FIG. 10

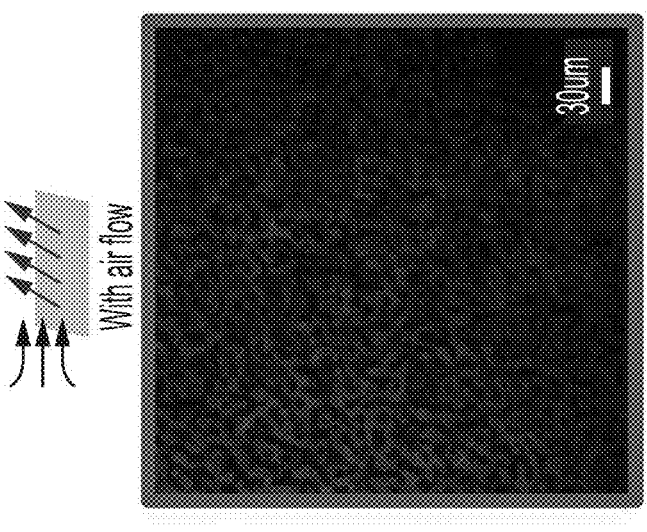
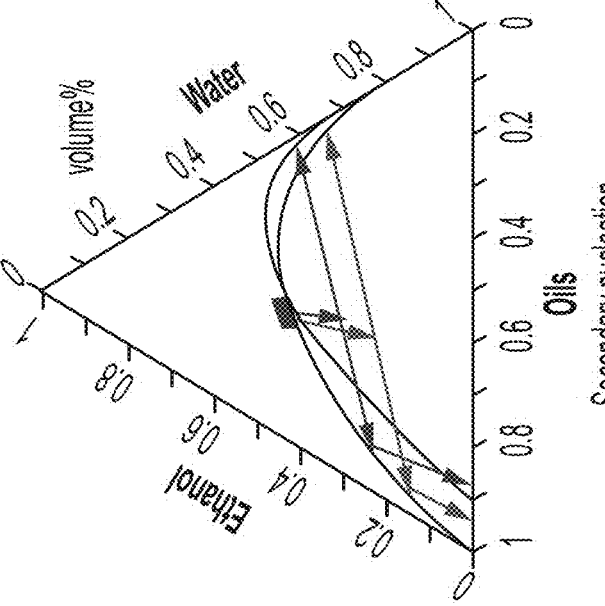
Characterization of VIPs structures
Water
volume %
Oils
Ethanol
Polymerized oil-rich phase
Water-rich phase
Secondary nucleation
Haase, Martin F. et al., *Angewandte Chemie International Edition* 53.44 (2014): 11793.
PRIOR ART
FIG. 11

Charterization of VIPs structures
Less quenched sample
From top to bottom : different quenching depth (ethanol concentration)
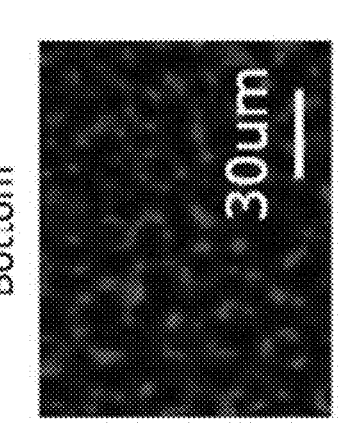
Bottom
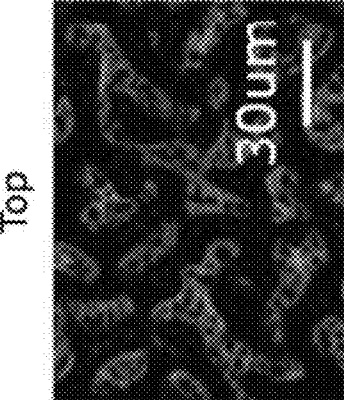
Top
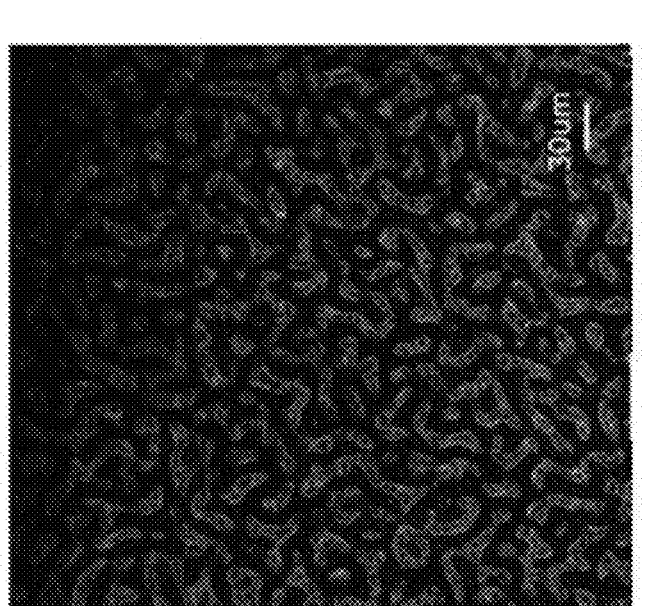
FIG. 12

Characterization of VIPs structures
Demonstration of structural continuity by dye diffusion
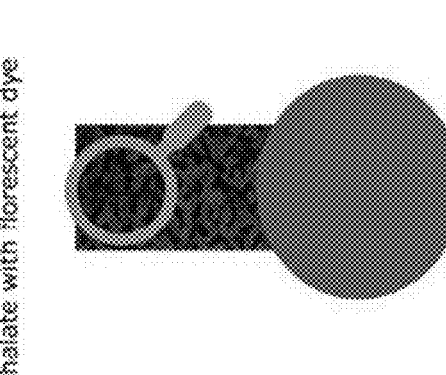
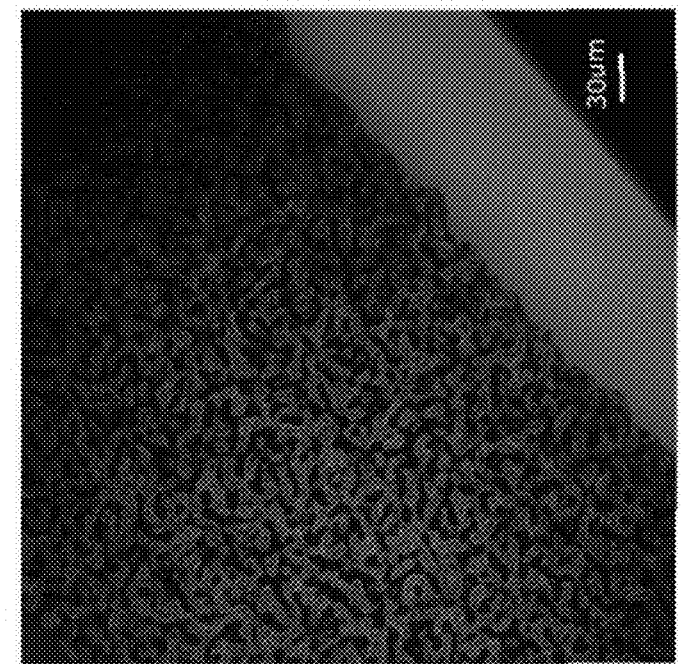
○ Polymerized oil-rich phase
● Channel left by Water-rich phase filled by Diethyl phthalate
● Diethyl phthalate with florescent dye
FIG. 13

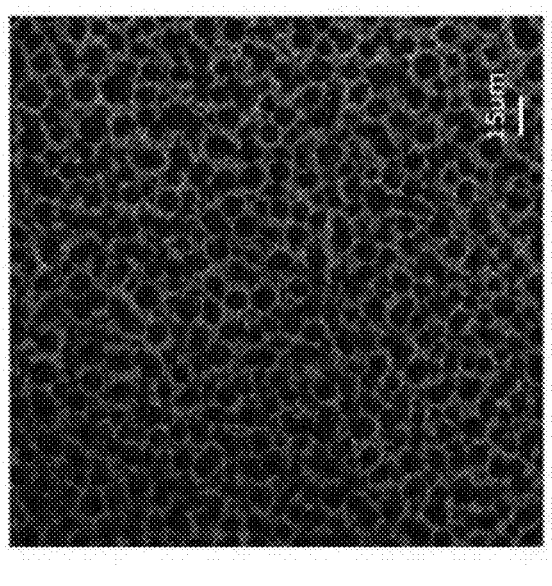
FIG. 14

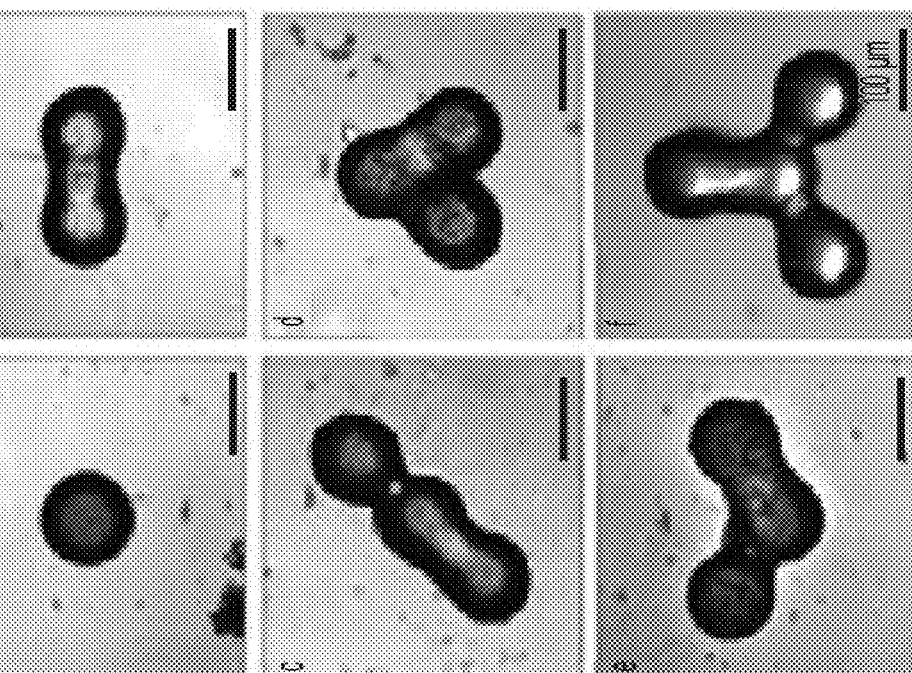
David A. Weitz et al.,
*The Journal of Physical Chemistry B*
113.12 (2009): 3914.
Characterization of VIPs structures
What we believe
The Merging of 'pickering emulsion' → bicontinuous
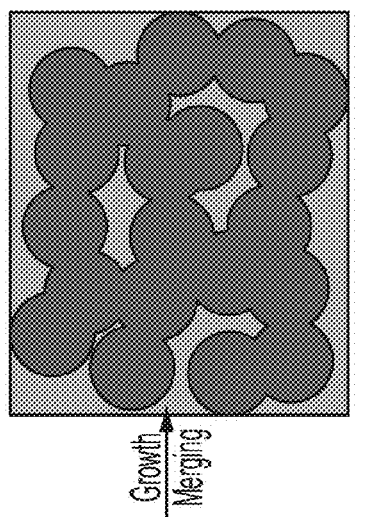
Growth
Merging
● Water rich phase
◎ Oil rich phase
PRIOR ART
FIG. 16

Conclusion
1. Hierarchical BIJEL structures were achieved by controlling quenching rate/depth of ternary system
2. Depending on proximity to critical point: BIJEL structure or a biphasic structure that is not relying on spinodal phase separation
3. Greatly simplified fabrication in continuous mode enables scalable applications
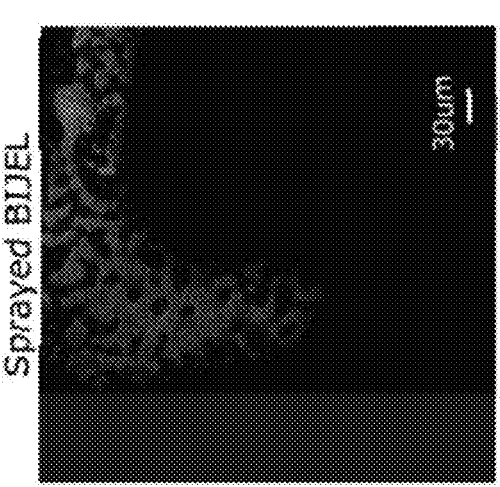
Sprayed BIJEL
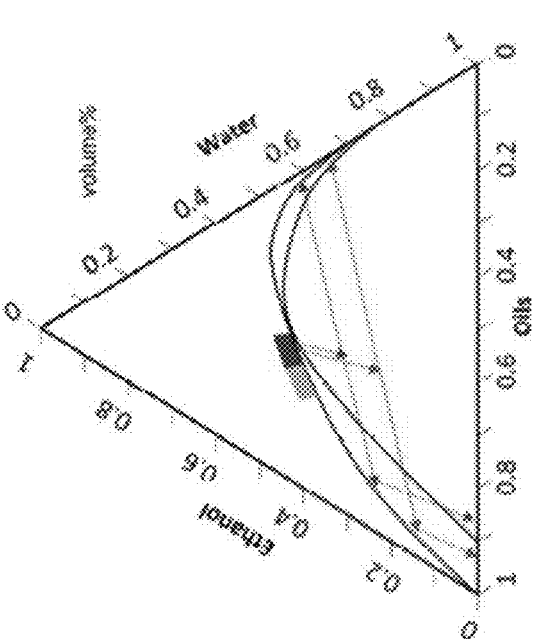
FIG. 18

FIG. 19A
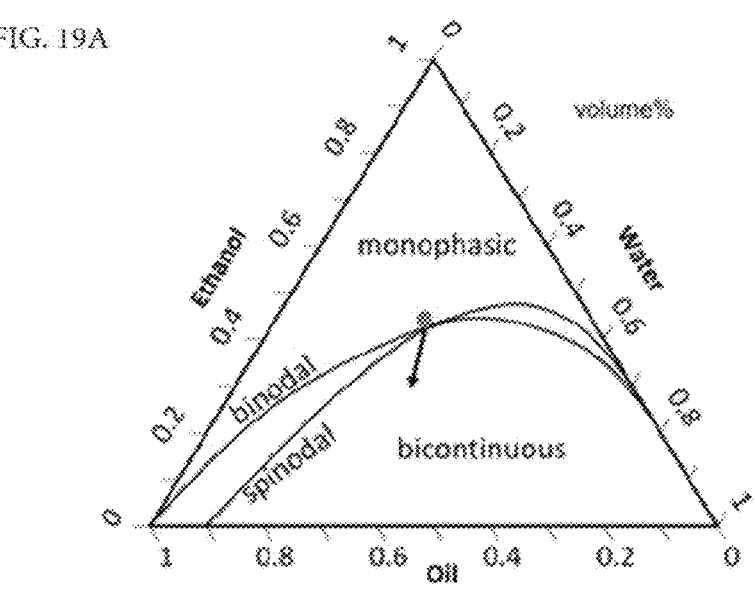
FIG. 19B
Ethanol evaporation
FIG. 19C
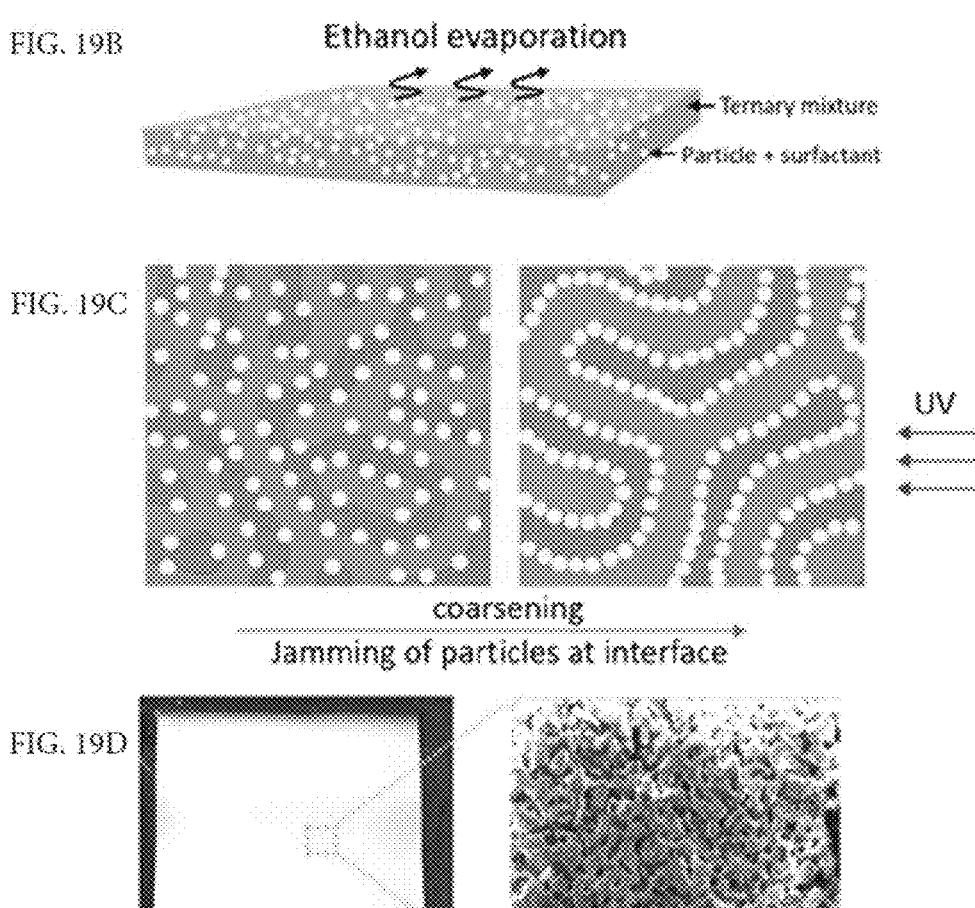
FIG. 19D

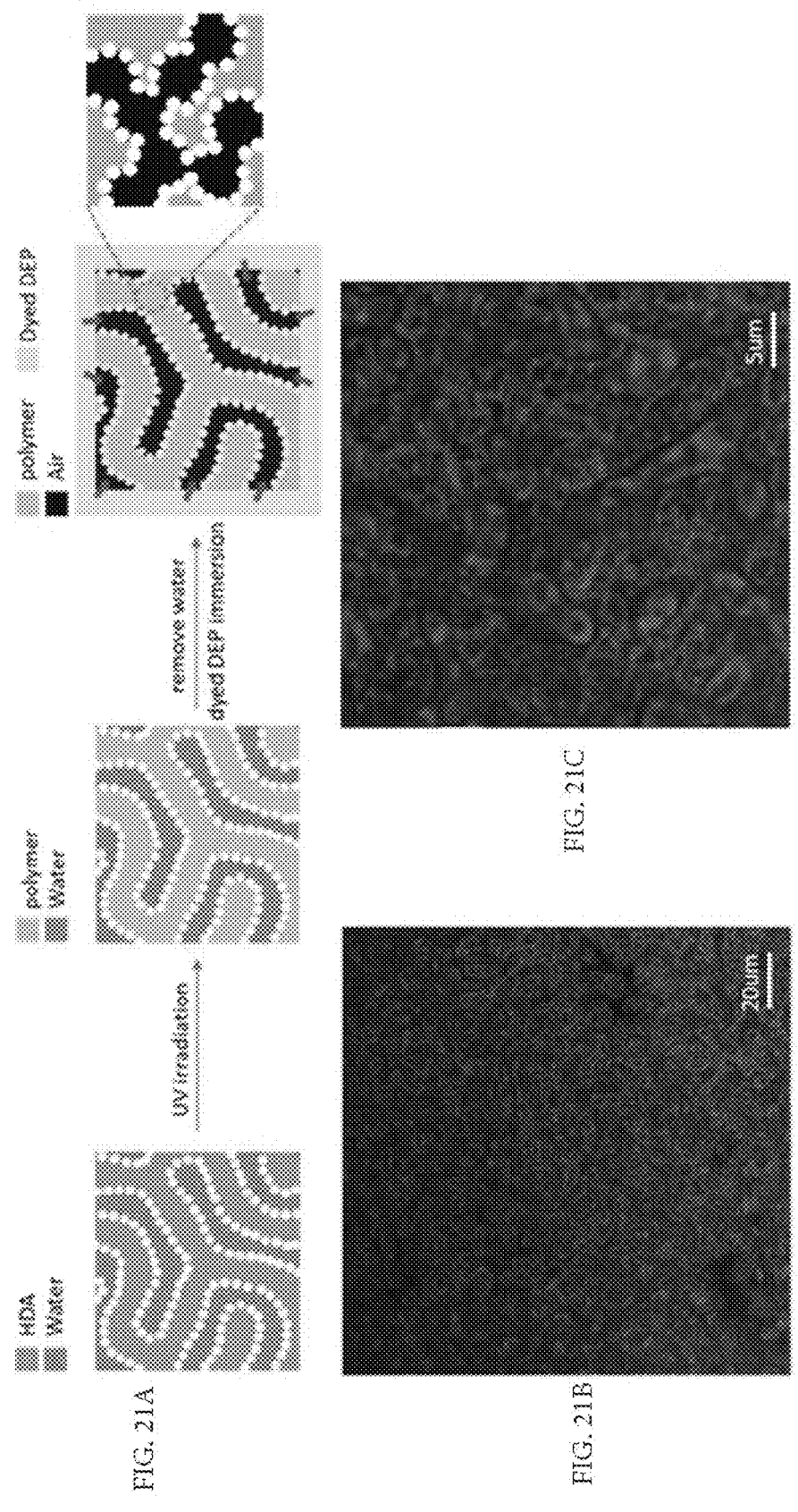

THREE DIMENSIONAL MULTIPHASIC STRUCTURES VIA VAPORIZATION INDUCED PHASE SEPARATION (VIPS)

RELATED APPLICATIONS

The present application is a divisional of U.S. patent application Ser. No. 17/093,720, "Three Dimensional Multiphasic Structures Via Vaporization Induced Phase Separation (VIPS)" (filed Nov. 10, 2020, and now issued as U.S. Pat. No. 11,786,879); which claims priority to and the benefit of U.S. patent application 62/933,606, "Three Dimensional Multiphasic Structures Via Vaporization Induced Phase Separation (VIPS)" (filed Nov. 11, 2019). The entireties of all foregoing applications are incorporated herein by reference for any and all purposes.

GOVERNMENT RIGHTS

This invention was made with government support under 1720530 awarded by the National Science Foundation. The government has certain rights in the invention.

TECHNICAL FIELD

The present field relates to the field of multiphasic structures and to evaporative methods of fabricating such structures.

BACKGROUND

The development of bicontinuous interfacially jammed emulsion gels (also known as "bijels") has greatly expanded the use and capabilities of multiphasic systems. There is, however, a need in the field of methods of fabricating such structures. In particular, there is a long-felt need for methods of fabricating such structure under ambient environmental conditions.

SUMMARY

In meeting the described long-felt needs, the present disclosure first provides methods, comprising: with a ternary mixture of a hydrophilic phase, an organic phase, and a co-solvent, the ternary mixture further having a plurality of particles disposed therein, giving rise to evaporation of the co-solvent into the environment exterior to the ternary mixture, the evaporation effecting (1) a phase separation that forms an interface between the hydrophilic phase and the organic phase, and (2) an assembly of at least some of the plurality of particles at the interface, the assembly arresting the phase separation and the evaporation giving rise to a multiphasic three-dimensional structure that defines a plurality of discrete domains therein.

Also provided are three-dimensional multiphasic structure made according to the present disclosure.

Further provided are systems, comprising: a dispenser configured to dispense a ternary mixture of a hydrophilic phase, an organic phase, and a co-solvent, the ternary mixture further having a plurality of particles disposed therein, the dispenser configured to controllably dispense the ternary mixture onto a substrate.

Also provided are systems, comprising: a dispenser configured to express into the atmosphere a ternary mixture of a hydrophilic phase, an organic phase, and a co-solvent, the ternary mixture further having a plurality of particles disposed therein, the system being configured to effect formation a free-standing multiphasic three-dimensional structure.

BRIEF DESCRIPTION OF THE DRAWINGS

The file of this patent or application contains at least one drawing/photograph executed in color. Copies of this patent or patent application publication with color drawing(s)/photograph(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

FIG. 6 provides an exemplary illustration of particle-stabilized biphasic structures;

FIG. 9 provides exemplary characterizations of structures made via VIPS, noting that a greater evaporation rate (of a co-solvent) can lead to smaller characteristic dimensions in the resulting structures;

FIG. 10 provides exemplary images of structures made vis VIPS;

FIG. 11 provides an exemplary illustration of a phase diagram (for secondary nucleation) and exemplary images of structures made via VIPS;

FIG. 12 provides further characterization of exemplary VIPS samples, showing the difference between images taken at the top surface of a sample made via VIPS and at the bottom surface of a sample made via VIPS;

FIG. 13 provides a demonstration of the structural continuity (shown via dye diffusion) within a material made via the disclosed VIPS technology;

FIG. 14 provides a further characterization of a structure made via VIPS, when the initial composition is away from the critical point (as shown in the phase diagram);

FIG. 16 provides an illustration of an exemplary mechanism (without being bound to any particular theory) for materials formation via the disclosed VIPS technology;

FIG. 18 provides an exemplary phase diagram and an image of an exemplary material formed via the disclosed VIPS technology from a sample sprayed on a substrate.

FIGS. 19A-19D provide an exemplary fabrication of bicontinuous particle-stabilized biphasic struc-ture via vaporization-induced phase separation (VIPS), with (FIG. 19A) A representative ternary phase diagram of oil, water and ethanol. A homogeneous precursor mixture with com-position represented by the blue point is quenched into the biphasic region upon evaporation of ethanol. The quenching path is indicated by the black arrow. Cetyl trimethyl ammo-nium bromide present in the mixture adsorbs on the silica particle surface to achieve neutral wetting of the silica particles at the interface. (b)-(c) Schematic of VIPS film formation: (FIG. 19B) The precursor mixture containing suspended silica particles and CTAB is applied on a sub-strate. Phase separation is then triggered by vaporization of ethanol. (FIG. 19C) Schematic of particle jamming at inter-face: As the interface coarsens, particles present in the mixture attach to the oil-water interface, form a jammed layer, and curtail further interface coarsening. (FIG. 19D) Macroscopic and microscopic morphology of VIPS film: After polymerization, the dried sample forms a white opaque free-standing film with uniform thickness and micro-scopic structures.

(FIG. 20A) Confocal microscope image of polymerized VIPS film made without additional airflow. Oil/water ratio in ternary mixture is 1.2. Zoom-in image shows the presence of water subdomains in oil rich phase. (FIG. 20B) Confocal microscope image of polymerized VIPS film made without additional airflow. Oil/water ratio in ternary mixture is 1.5. (FIG. 20C) SEM images of polymerized VIPS film sputtered with 4 nm Ir layer. The voids inside the polymer structure are the regions that were water-filled subdomains. The oil-water interface is covered with silica particles (FIG. 20D) Representaive quenching paths of the mixture. Path 1 represents slow evaporation and path 2 represents faster evaporation. The initial compositions of the oil-rich and water-rich phases are indicated by the arrows pointed to the binodal curve. (FIG. 20E) Confocal microscope image of polymerized VIPS film made with additional airflow.

FIGS. 21A-21C provides exemplary images from a dye permeation experiment. (FIG. 21A) Polymerized and dried VIPS film is placed in DEP containing the dye 9,10-bis (phenylethynyl)anthracene (BPA). Confocal microscopy is used to image the middle layer of the film sample. The green phase is polymer phase, red phase is BPA-containing DEP phase. (FIG. 21B) Confocal microscopy image of VIPS film after 30 mins of dye permeation. Most channels previously filled with the water phase prior to drying the sample are filled with BPA-containing DEP, indicating a continuous water structure. A few spots are occupied by air trapped inside. (FIG. 21C) Confocal microscope images of VIPS structure after dye permeation showing BPA-containing DEP permeates through both primary water-rich domains and water subdomains inside the oil-rich phase, indicating a bijel-in-bijel structure.

(FIG. 22B) confocal microscope image of nucleation and growth sample with seemingly discrete water phases. (FIG. 22C) After 30 mins immersion, BPA-containing DEP occupied the seem-ingly discrete spaces left by the water phase. (FIG. 22D) SEM image of off-critical sample, showing clearly merging of water droplets. (FIG. 22E) Jamming of particles at interface arrested the merging of two partially covered droplets. (FIG. 22F) The arrested merging of many partially covered droplets results in a percolating structure.

(FIG. 23A) Depiction of VIPS film formation via spray: Precursor mixture containing suspended silica particles and CTAB is sprayed on a substrate from a spray bottle. Phase separation is then triggered by vaporization of ethanol accelerated by airflow. (FIG. 23B) Confocal microscopy images of polymerized sprayed VIPS film at different length scales showing the structure integrity of VIPS film with hierarchical and bicontinuous structure.

(FIG. 24A) VIPS bijel prepared with 15 wt % silica nanoparticle and airflow. (FIG. 24B) VIPS bijel pre-pared with 20 wt % silica nanoparticles without airflow.

(FIG. 25A) confocal scanning laser micrograph of polymerized VIPS bijel film, green phase: poly(HDA) phase, dark phase: mixture of water and ethanol phase. (FIG. 25B) threshold binary image processed by ImageJ.

DETAILED DESCRIPTION OF ILLUSTRATIVE EMBODIMENTS

Figure 1:
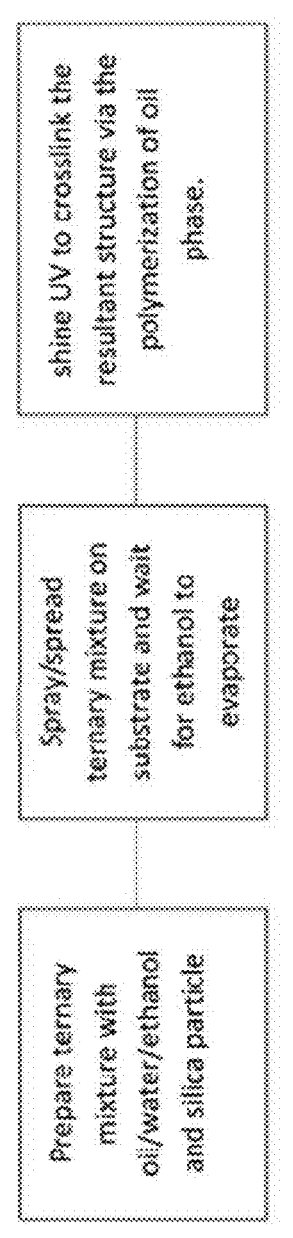
FIG. 1 provides an exemplary overview of the VIPS process.

The present disclosure may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps can be performed in any order.

It is to be appreciated that certain features of the invention which are, for clarity, described herein in the context of separate embodiments, can also be provided in combination in a single embodiment. Conversely, various features of the invention that are, for brevity, described in the context of a single embodiment, can also be provided separately or in any subcombination. All documents cited herein are incorporated herein in their entireties for any and all purposes.

Further, reference to values stated in ranges include each and every value within that range. In addition, the term "comprising" should be understood as having its standard, open-ended meaning, but also as encompassing "consisting" as well. For example, a device that comprises Part A and Part B can include parts in addition to Part A and Part B, but can also be formed only from Part A and Part B.

As used herein, a "bijel" relates to bicontinuous interfacially jammed emulsion gels, which are nonequilibrium structures formed by jamming colloidal particles at the interface between two partially miscible fluids undergoing spinodal decomposition. By contrast to conventional emulsions, bijels have a stable bicontinuous liquid architecture that includes two immiscible liquids separated by an interfacial layer of jammed colloidal particles. The bicontinuous structure can be accessible via the mechanism of spinodal decomposition. Spinodally decomposing liquid-liquid mixtures are dynamically evolving nonequilibrium structures, which can in turn yield two completely separated phases. Spinodal decomposition can be arrested during phase separation by solidification of one of the phases. This approach has been established for the formation of phase inversion membranes or electrospun fibers. In both cases, removal of a solvent can cause the solidification of a phase-separating polymer.

One method of producing bijels is the so-called solvent transfer induced phase separation (STRIPS) method, which prepares bijels from ternary mixtures of oil, water and co-solvent (ethanol). Although STRIPS enables continuous processing, the technique's further requirement of an outer aqueous phase can limit application to liquid environments. Thus, the ability to produce bijels in air will further expand their applications in areas such as coatings and surface modification applications.

Provided here is, inter alia, a new method to produce three dimensional multiphasic structures, including bijels, via vapor-induced phase separation ("VIPS"). In VIPS, the evaporation of co-solvent from a ternary mixture of an organic phase (e.g., oil), a hydrophilic phase (e.g., water), and the co-solvent (e.g., ethanol), induces phase separation. Particles present in the mixture then attach to the interface and arrest the phase separation between water and oil.

VIPS enables the fabrication of various 3D structures (e.g., films, fibers, fiber segments, particles, coatings, membranes, and other structures) via spreading or spraying particle-laden suspension onto a surface (or into the environment) without the need for an outer aqueous phase. This disclosure also characterizes the structure of VIPS films on different substrates, and also provides exemplary non-limiting results concerning the influence of initial composition, substrate surface wettability, and surrounding temperature.

Exemplary Disclosure

Figure 2:
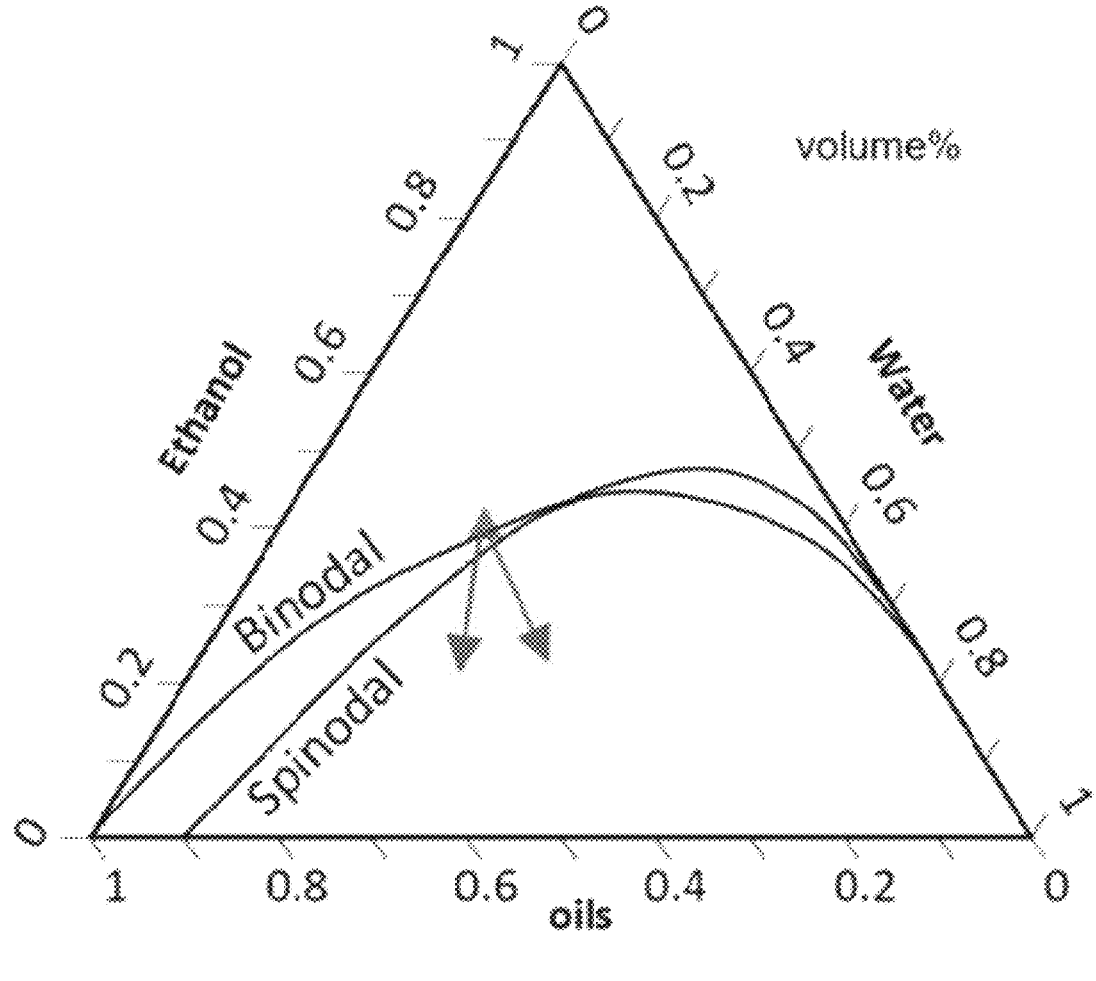
FIG. 2 provides exemplary quenching paths of a ternary mixture upon removal of ethanol, blue arrow (pointing more rightward) indicates STRIPS while red arrow (pointing more leftward) represents VIPS.

An exemplary VIPS process is shown in FIG. 1. In the VIPS method, the preparation of ternary mixture is similar but slightly different in composition with STRIPS due to the absence of outer aqueous phase. Without the uptake of water from outer aqueous phase, the quenching of VIPS ternary mixture takes a different path, as shown in the ternary phase diagram in FIG. 2. The blue arrow indicates STRIPS while red arrow represents VIPS. Also, because of the continuously losing of water due to co-evaporation with ethanol, more particles are needed to maintain the structure.

Figures 3A, 3B, 3C:
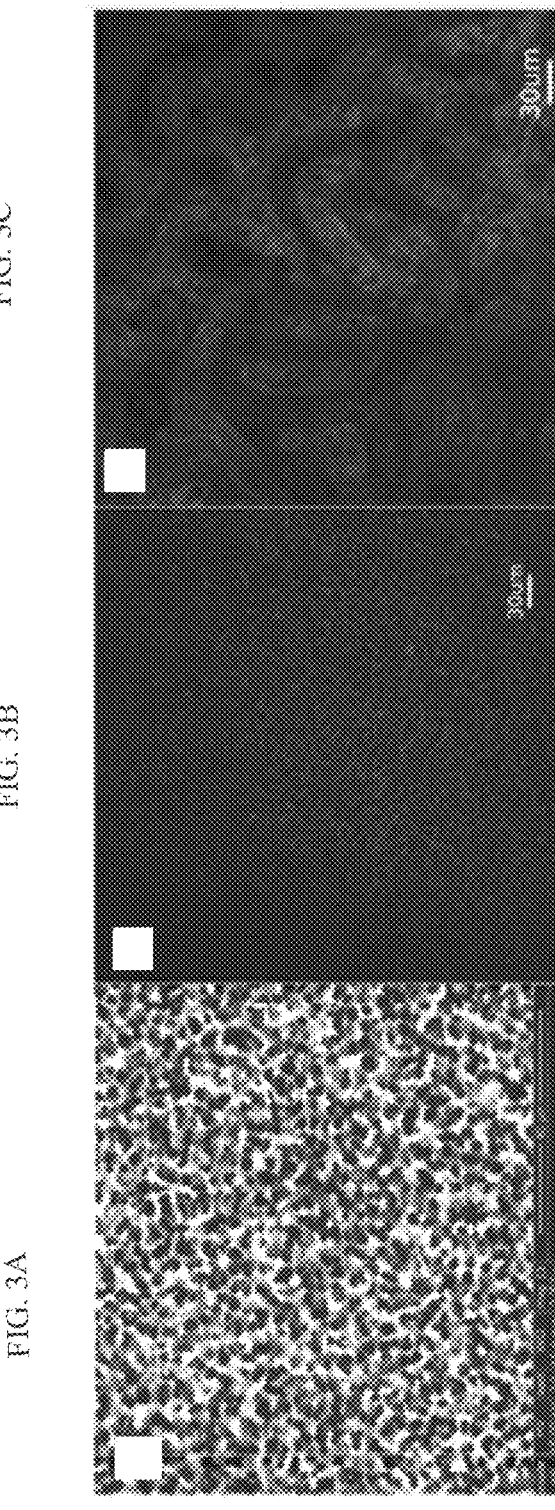
FIGS. 3A-3C provide exemplary 3D structures via VIPS, (FIG. 3A) SEM image of an exemplary polymerized bicontinuous structure, (FIG. 3B) and (FIG. 3C) are confocal images of polymerized cellular structure and double-emulsion respectively.

With particle loading increased to ~20 wt %, by adjusting initial composition of ternary mixture, varies 3D structures including BIJEL can be achieved via VIPS as shown in FIGS. 3A-3C. FIG. 3A shows the SEM image of an exemplary polymerized bicontinuous structure. FIG. 3B and FIG. 3C are confocal images of polymerized cellular structure and double-emulsion respectively (green domain represents polymerized oil phase).

Figures 4A, 4B, 4C:
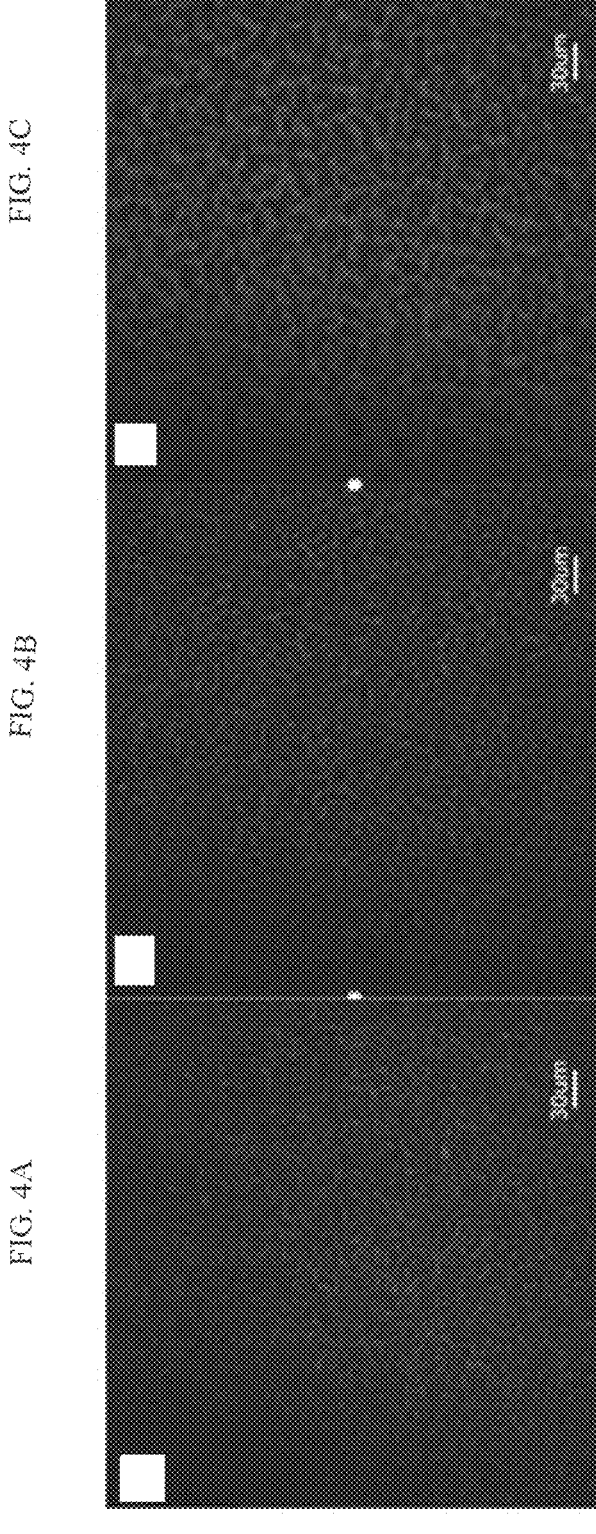
FIGS. 4A-4C provide confocal images at different depths of an exemplary cellular sample, from the surface (FIG. 4A), an intermediate depth (FIG. 4B), and the bottom (FIG. 4C) of the sample.

To show the 3D structure, confocal images at different depth of a cellular sample are shown in FIGS. 4A-4C. From surface (FIG. 4A) to bottom (FIG. 4C) of the sample, micron-size voids were observed and distributed in a disordered way. In addition, the size of the structure increases gradually along the Z-direction. The disordered and multiscale features of the cellular structure also apply to bicontinuous and other structures obtained via VIPS.

One application of VIPS films is passive cooling coating on building surfaces, as micro/nano-voids have been shown to reflect light. In this way, disordered and multi-scale structure can enhance the performance by reflecting incident light of wide range of wavelengths and incident angles. In addition, the emission of heat is enhanced by the porous, open surface which facilitated heat radiation.

Figure 5:
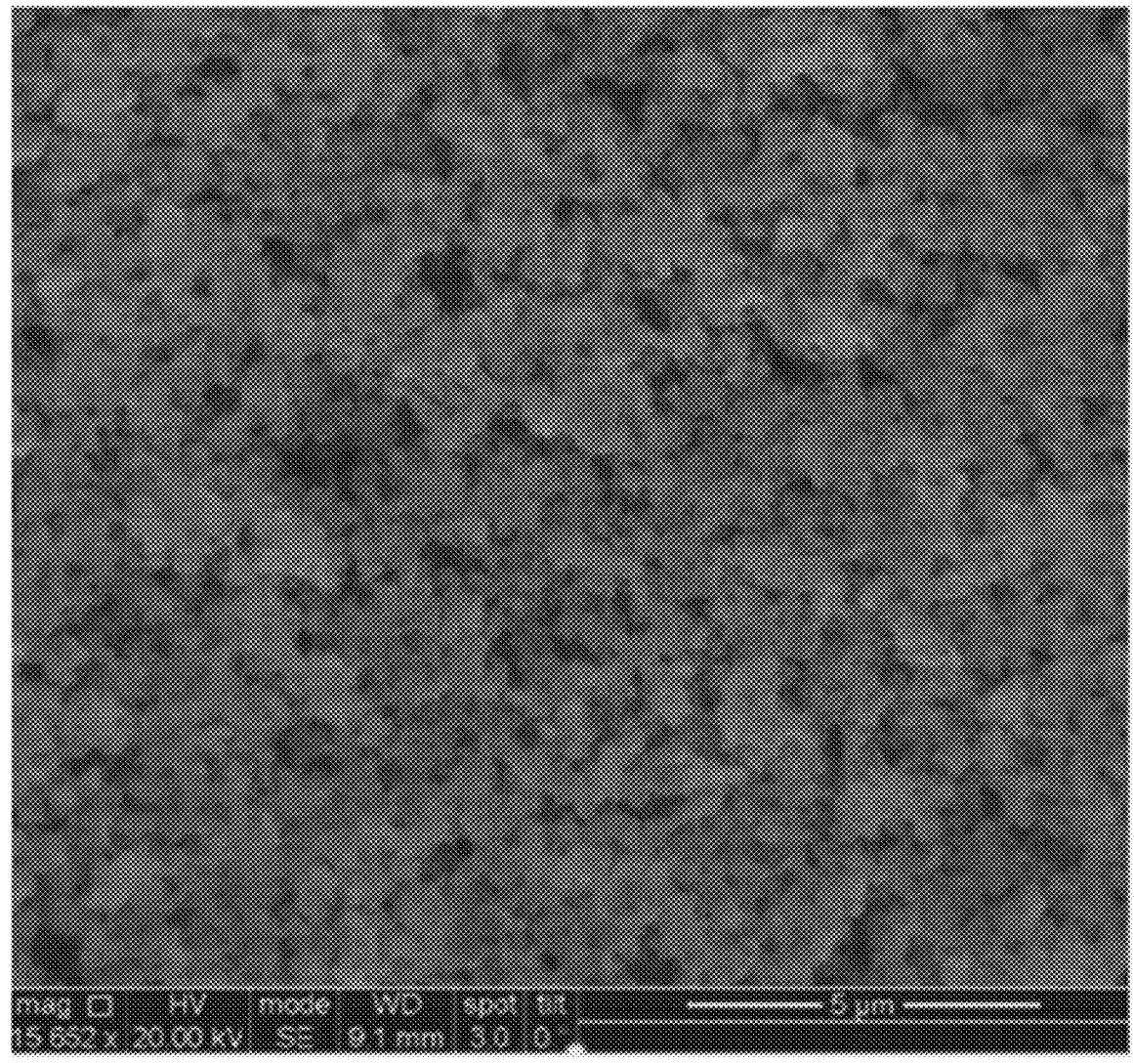
FIG. 5 provides an exemplary SEM image of polymerized VIPS film made with titanium dixoide particles.
Figure 7:
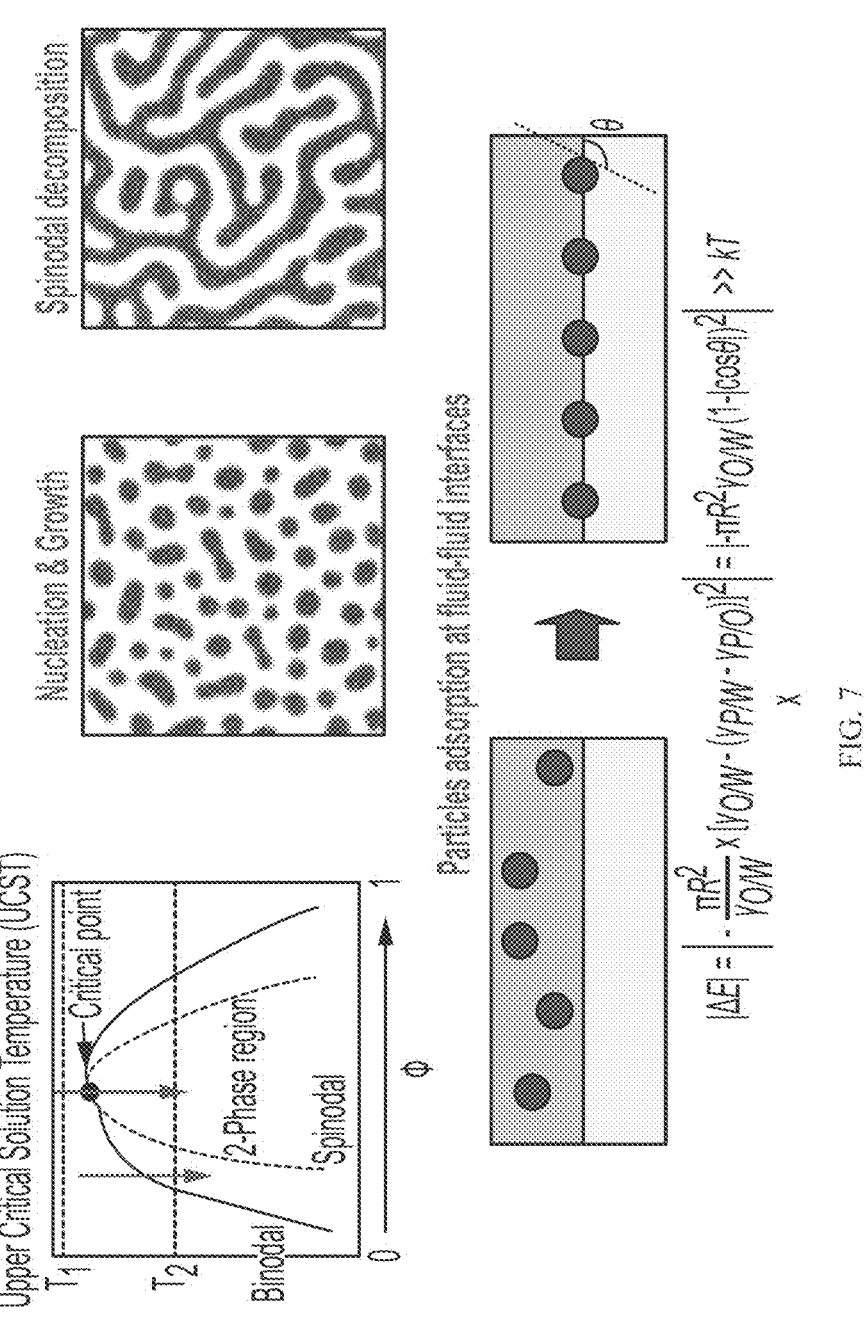
FIG. 7 provides further illustration of particle-stabilized biphasic structures, showing phase separation.
Figure 8:
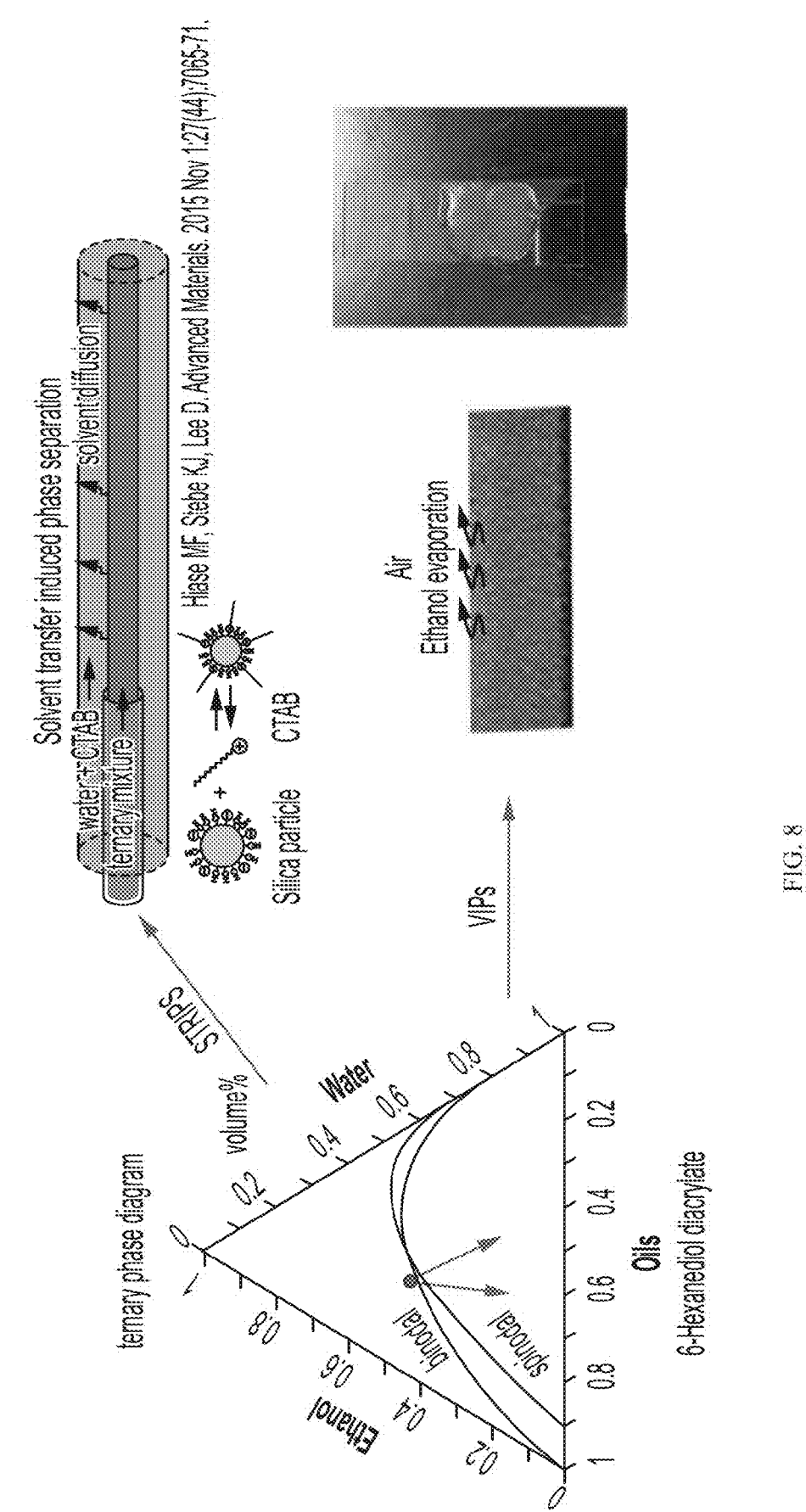
FIG. 8 provides an exemplary illustration of a phase diagram and vapor-induced phase separation (VIPS), as compared to solvent-transfer induced phase separation (STRIPS)
Figure 15:
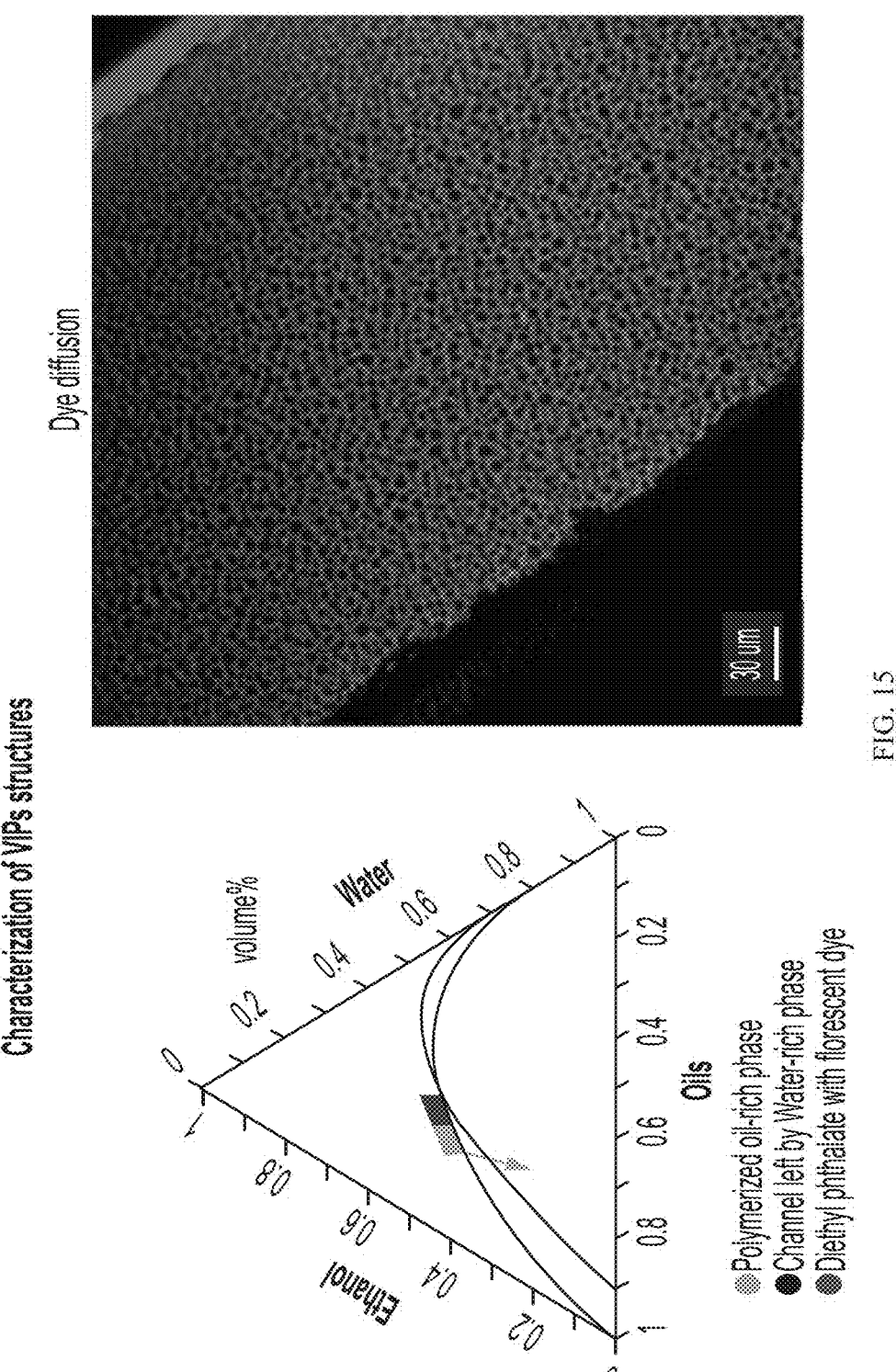
FIG. 15 provides a further characterization of a structure made via the disclosed VIPS technology.
Figure 17:
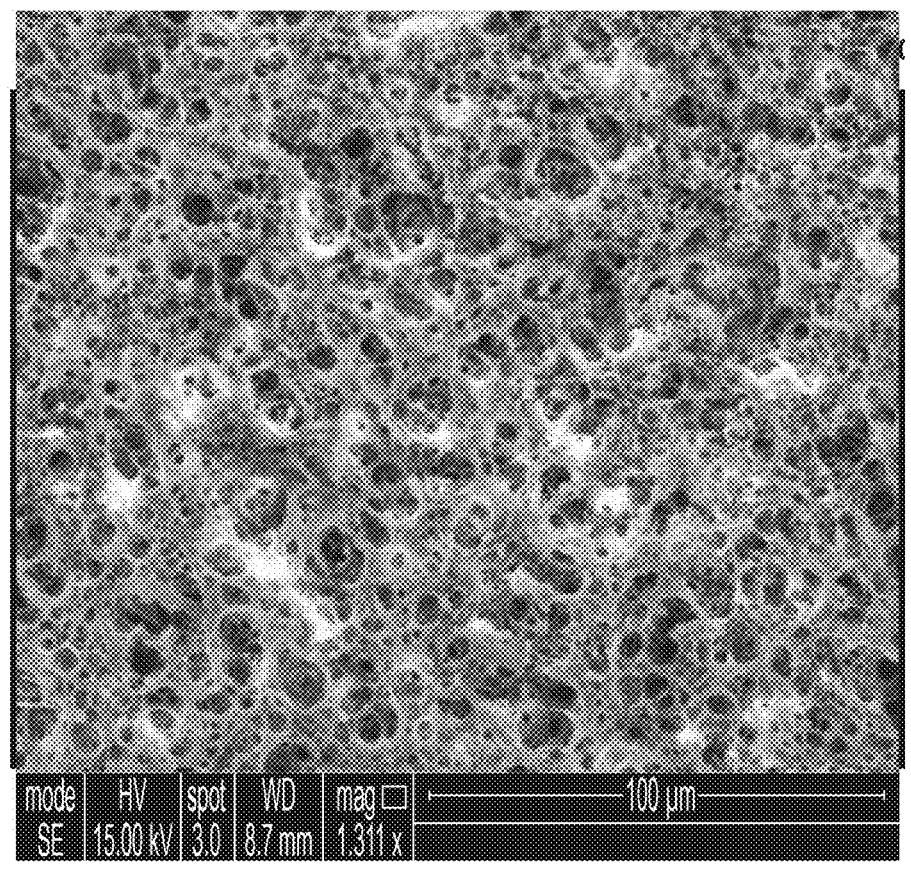
FIG. 17 provides an exemplary image of a material made according to the disclosed VIPS technology.

As an example, metal oxide particles can also be used in the VIPS method, e.g., zinc oxide and titanium dixoide particles, as shown in FIG. 5. Because of the light-scattering ability of these particles, thermal polymerization was used instead of UV-polymerization to crosslink the oil phase.

The present disclosure demonstrates the utility of VIPS, in terms of its flexibility and controllability. Not only are the choices of components (oil, co-solvent and particle) flexible, but also the morphology and size distribution of VIPS structure is under control. By changing initial composition, a variety of structures (e.g., bicontinuous, cellular, double-emulsion) can be obtained. The size distribution of structure can be determined by the particle concentration and the thickness of film. Higher particle-loading and thicker film formation result in finer structure and wider size distribution.

EMBODIMENTS

The following embodiments are exemplary only and do not serve to limit the scope of the present disclosure or of the appended claims.

Embodiment 1. A method, comprising: with a ternary mixture of a hydrophilic phase, an organic phase, and a co-solvent, the ternary mixture further having a plurality of particles disposed therein, giving rise to evaporation of the co-solvent into the environment exterior to the ternary mixture, the evaporation effecting (1) a phase separation that forms an interface between the hydrophilic phase and the organic phase, and (2) an assembly of at least some of the plurality of particles at the interface, the assembly arresting the phase separation and the evaporation giving rise to a multiphasic three-dimensional structure that defines a plurality of discrete domains therein.

It should be understood that the ternary mixture can include, e.g., one or more surfactants, although this is not a requirement. Ionic surfactants can be used, but such surfactants are, again, not required. A user can adjust the number of adsorption sites for ionic surfactants on the particle surfaces. Adsorption sites can be, e.g., dissociated silanol groups.

Particle loading can be, e.g., from about 5 to about 25 wt % (e.g., 5, 6, 7, 8, 9, 10, 11, 12, 13, 14, 15, 16, 17, 18, 19, 20, 21, 22, 23, 24, or 25%) based on the total weight of all components in the ternary mixture. The hydrophilic phase (e.g., water) can be present at from about 10 to about 25% (e.g., 10-25%, 12-23%, 14-20%, 16-18%) by total volume. The organic phase can be present at from about 30 to about 50% (e.g., 30-50%, 32-48%, 34-46%, 36-44%, 38-42%, 40%) by total volume. The co-solvent can be present at from about 30 to about 50% (e.g., 30-50%, 32-48%, 34-46%, 36-44%, 38-42%, 40%) by total volume.

The hydrophilic liquid of the ternary liquid mixture can be limited to a simple liquid which is polymerizable or non-polymerizable (e.g., water, polyethyleneglycoldiacrylate, acrylic acid, etc.). In other embodiments, the hydrophilic liquid includes the combination of a simple liquid and a substantially hydrophilic monomer which is polymerizable. A hydrophilic monomer can be polymerized to form a hydrogel in the aqueous/hydrophilic domains.

Non-limiting examples of hydrophilic polymerizable monomers that can be used in accordance with embodiments of the present invention include polyethyleneglycol diacrylate (PEG-DA), acrylamide (5-% PEG-DA) or acrylic acid (5% PEG-DA). For example, a hydrophilic polymerizable monomer (e.g., PEG-DA) can be added to the hydrophilic liquid of the ternary mixture.

One or more components of the ternary mixture can have an acidic pH. Alternatively, one or more components of the ternary mixture can have a neutral or even an alkaline pH.

Embodiment 2. The method of Embodiment 1, wherein the three-dimensional structure is characterized as being a bicontinuous structure, a cellular structure, or a double-emulsion structure.

Embodiment 3. The method of Embodiment 2, wherein the three-dimensional structure is characterized as being a bicontinuous structure.

Embodiment 4. The method of any one of Embodiments 2-3, wherein the three-dimensional structure defines a thickness in the Z-direction.

Embodiment 5. The method of Embodiment 4, wherein discrete domains located at different positions along the Z-direction define different average cross-sectional dimensions. As an example, the domains at a first location along the Z-direction can define an average cross-sectional dimension of A1, and the domains at a second location along the Z-direction can define an average cross-sectional dimension of A2, wherein A2 differs from A1.

Embodiment 6. The method of any one of Embodiments 4-5, wherein the thickness is in the range of from about 1 micrometers to about 10,000 micrometers. The thickness can be, e.g., from about 1 micrometer to about 10,000 micrometers, or from about 1 micrometer to about 5,000 micrometers, or from about 1 micrometer to about 1,000 micrometers, or from about 1 micrometer to about 500 micrometers, or from about 5 micrometers to about 100 micrometers, or from about 10 micrometers to about 50 micrometers, as well as all included values and sub-ranges.

Embodiment 7. The method of any one of Embodiments 1-6, further comprising (a) applying the ternary mixture to a substrate or (b) expressing the ternary mixture into the environment.

Applying can be accomplished by, e.g. flow coating, flow casting, dip coating, spray coating, roll to roll, gravure, blade coating, and the like. Spray coating is considered especially suitable.

By expressing the ternary mixture into the environment, one can "spin" bijel fibers and otherwise form free-standing bijel structures, e.g., a continuous bijel ribbon or a continuous bijel tape. A free-standing structure can be collected, e.g., via being wound up on a spool, reel, or other collector. A free-standing structure can also be collected in a collection container.

Embodiment 8. The method of any one of Embodiments 1-7, wherein the co-solvent comprises an alcohol, acetone, tetrahydrofuran, or any combination thereof. Ethyl lactate is considered a suitable co-solvent. A suitable co-solvent can be a species that is miscible with the hydrophilic phase and the organic phase (sometimes termed the "oil phase"), but which species evaporates more quickly than the hydrophilic phase and the organic phase.

In some embodiments, the ternary liquid mixture can include a hydrophilic liquid (e.g., water, ethylene glycol, ethanediol), a hydrophobic liquid (e.g., an oil such as diethyl phthalate (DEP), dimethylphthalate, 1,6-hexanediol diacrylate, 1,6-diacetoxyhexane, trimethylolpropane triacrylate, dipentaerythritol pentaacrylate, laurylacrylate, butylacrylate, oleic acid, chloroform, styrene, triacetin, decanol, toluene, etc.), and a (co-)solvent (e.g., methanol, ethanol, propanol, acetic acid, dimethylsulfoxide, acetone, tetrahydrofuran, and the like). Some exemplary species are described in U.S. patent application Ser. No. 15/579,086 (by Haase, et al.), the entirety of which is incorporated herein by reference for any and all purposes.

Embodiment 9. The method of any one of Embodiments 1-8, wherein the plurality of particles comprises polymeric particles, metal particles (including alloys), metal oxide particles, naturally-occurring particles, or any combination thereof.

Embodiment 10. The method of Embodiment 9, wherein the metal oxide particles comprise zinc oxide particles, titanium dioxide particles, or both.

Embodiment 11. The method of any one of Embodiments 1-10, wherein the method is performed under ambient conditions. It should be understood that a user can select the co-solvent such that the co-solvent is one that evaporates under ambient conditions.

Embodiment 12. The method of any one of Embodiments 1-10, wherein the method is performed under reduced humidity conditions. A reduced-humidity environment can be used to encourage the evaporation of the co-solvent from the ternary mixture. A user can modulate the humidity in the environment exterior to the ternary mixture so as to increase, decrease, or even stop the evaporation of the co-solvent from the ternary mixture.

Embodiment 13. The method of any one of Embodiments 1-10, wherein the method is performed under increased humidity conditions. Increased humidity can be used to slow the evaporation of the co-solvent from the ternary mixture. It should be understood that the user can modulate the content of the co-solvent species in the ambient environment exterior to the ternary mixture.

Embodiment 14. The method of any one of Embodiments 1-13, further comprising effecting motion of an atmosphere over the ternary mixture so as to modulate the evaporation of the co-solvent. This can be accomplished by, e.g., a van, a blower, a hood, or other modality configured to effect atmospheric movement above the ternary mixture. Such atmospheric movement can in turn encourage the evaporation of the co-solvent from the ternary mixture.

Embodiment 15. The method of any one of Embodiments 1-14, wherein at least one of the organic phase and the hydrophilic phase comprises a polymerizable monomer. The monomer can be polymerizable by, e.g., heat, UV illumination, and the like. A ternary mixture can include one or more cross-linkers, polymerization initiators, or even terminator species.

As an example, a photoinitiator (e.g., Irgacure 2595) or a thermal initiator (e.g., potassium persulfate) can be added to the hydrophilic liquid of the ternary mixture with a fraction of approximately 1% (e.g., from 0.50% to 1.50%). After a bijel is formed, polymerization of the hydrophilic monomer can be initiated by UV-light radiation or heat exposure (e.g., 70 degrees C.), respectively.

Without being bound to any particular theory or embodiment, when a polymerizable monomer is employed, the monomer can be crosslinkable via radical polymerization in the presence of a photoinitiator. Non-limiting examples of polymerizable monomers include, e.g., 1,6-hexanediol diacrylate, butylacrylate, laurylacrylate, styrene, trimethylolpropane triacrylate, or dipentaerythritol pentaacrylate. The monomers are preferably polymerizable upon exposure to UV light.

Embodiment 16. The method of Embodiment 15, further comprising polymerizing the monomer. Polymerization can be accomplished by, e.g., UV light, heat, or other perturbations. Those of ordinary skill in the art will not encounter any difficulty in identifying suitable polymerization methods.

It should be understood that a monomer one or more phases of the ternary mixture can be polymerized. It should also be understood that polymerization can also be effected between particles, e.g., to affix neighboring particles to one another.

In some embodiments, the bijels are "polymerized" (e.g., the monomers of the oil phase are polymerized and/or the hydrophilic monomers present in the hydrophobic liquid/water phase are polymerized). In other embodiments, the bijels are not polymerized. When the bijels are not polymerized, the only solid components of the bijels are the nanoparticles located at the oil-water interface, and the remainder of the bijels is liquid.

Embodiment 17. The method of any one of Embodiments 1-16, wherein the method is performed so as to form the three-dimensional structure in a continuous manner. This can be accomplished by, e.g., a conveyor-style advancement of a substrate (e.g., glass slides) through a spray cabinet. Alternatively, a ternary mixture dispenser can be moved in a continuous way along a substrate onto which the ternary mixture is dispensed.

Embodiment 18. The method of any one of Embodiments 1-16, wherein the method is performed so as to form the three-dimensional structure in a batch manner.

Embodiment 19. A three-dimensional multiphasic structure made according to any one of Embodiments 1-18.

As described elsewhere herein, such a structure can be, e.g., bicontinuous or cellular in nature; such a structure can also be an emulsion in structure. A bijel can have temperature-independent stability, and the domain sizes of the bijel are less than about 10 micrometers (e.g., they can range from about 100 nm to about 5 micrometers or from about 200 nm to about 4 micrometers or from about 300 nm to about 3 micrometers).

Bijels can be present as films, but can also be present as fibers, plugs, or even membranes. Non-limiting examples of such materials and compositions include a fiber scaffold for tissue engineering (e.g., a solid polymer scaffold), a cosmetic composition, a food composition, a filter, and a fog harvesting mesh. Bijels can be used in cross-flow reactors. Bijels have applications in healthcare, cosmetics, food, energy and chemical technologies; as a further example, bijels can provide structural frameworks for chemical separations and catalytic processes.

As a specific example, a bijel of the present invention can be used as a counter flow reactor for biphasic chemical reactions. Catalytic particle stabilized emulsion droplets for biphasic chemical reactions have previously been developed. Introducing bijel fibers of the present invention for this purpose could greatly improve the efficiency of the process: the porous structure of the fibers provides not only a larger surface area for the chemical reactions compared to the surface area of mere droplets, but the entire operation becomes a continuous process when the bicontinuous fiber is used as a counter flow reactor.

Embodiment 20. A system, comprising: a dispenser configured to dispense a ternary mixture of a hydrophilic phase, an organic phase, and a co-solvent, the ternary mixture further having a plurality of particles disposed therein, the dispenser configured to controllably dispense the ternary mixture onto a substrate.

Embodiment 21. The system of Embodiment 20, further comprising an environmental chamber configured so as to contain a substrate onto which the dispenser has dispensed the ternary mixture.

Embodiment 22. The system of Embodiment 21, wherein the environmental chamber is configured to modulate a temperature within the environmental chamber, a humidity within the environmental chamber, or both. As described elsewhere herein, the environmental chamber can also be configured to modulate a humidity and/or vapor content within the chamber.

Embodiment 23. The system of any one of Embodiments 20-22, further comprising a heater configured to heat the substrate. It should be understood, however, that changes in temperature are not required to initiate phase separation. Forming bijels according to the present disclosure can be performed at room temperature (e.g., about 23 degrees C. to about 26 degrees C.).

Embodiment 24. The system of any one of Embodiments 20-23, further comprising a supply of the ternary mixture.

Embodiment 25. The system of any one of Embodiments 20-24, further comprising a supply of the substrate.

Embodiment 26. A system, comprising: a dispenser configured to express into the atmosphere a ternary mixture of a hydrophilic phase, an organic phase, and a co-solvent, the ternary mixture further having a plurality of particles disposed therein, the system being configured to effect formation a free-standing multiphasic three-dimensional structure.

As an example, the system can be configured to express the ternary mixture into an environment configured to effect evaporation of the co-solvent at a rate such that a fiber, tape, or other free-standing three-dimensional structure forms, as described elsewhere herein.

Additional Disclosure

In this work, a new method to produce a variety of three-dimensional multiphasic structures including bijels via vapor-induced phase separation (VIPS) is demonstrated. VIPS enables the fabrication of films and coatings by spreading or spraying a particle-laden suspension onto a surface without the need of an outer aqueous phase. Intriguingly, a regime in which secondary nucleation of structures occurs within phase separated domains is identified, leading to hierarchically bicontinuous biphasic structures. The dimensions of phase separated domains can be controlled by the rate of co-solvent removal. Moreover, a different path to bicontinuous morphology is identified which does not occur via spinodal decomposition, but rather relies on the formation of percolating structures of partially coalesced particle-covered drop-lets. The VIPS process provides a scalable path to produce bicontinuous biphasic composites with hierarchical structures for advanced coatings and membranes applications.

One example of particle-stabilized biphasic structures is the Pickering emulsion, in which discrete liquid droplets dispersed in a continuous liquid phase are stabilized by particles at the liquid-liquid interface. More recently, a unique class of particle-stabilized structures called bicontinuous interfacially jammed emulsion gels (bijels) has been discovered, formed by arresting the coarsening of water and oil domains during spinodal de-composition via the attachment and jamming of particles at the liquid-liquid interface. The stability of the bicontinuous morphology and the possibility of interphase mass transfer and incorporation of functional nanoparticles make these biphasic structures potentially useful for many applications including coatings, energy storage devices and in reactive separations schemes.

One versatile method to produce bijels is solvent transfer-induced phase separation (STRIPS). In STRIPS, by removing a co-solvent such as ethanol from a homogeneous mixture of oil, water and co-solvent into an outer aqueous phase, phase separation is triggered, and a bicontinuous morphology of oil and water domains is stabilized by jamming of particles at the oil-water interface. Compared with the thermal quenching method traditionally used to induce phase separation. STRIPS enables continuous fabrication of bijels with a variety of oil/water pairs. However, its application may be limited by the need for an aqueous external phase to remove the co-solvent. For applications ranging from personal care products to coatings on surfaces, the need for the external liquid environment complicates the fabrication process. Therefore, an approach that does not rely on the presence of an external liquid medium would eliminate these complications and facilitate scalable manufacturing, further expanding the potential of particle-stabilized bi-phasic systems.

Here, we describe the scalable manufacturing of a variety of particle-stabilized biphasic structures in air via vaporization-induced phase separation (VIPS). In VIPS, rather than removing the co-solvent (e.g., ethanol) into an outer aqueous phase, vaporization of ethanol into air triggers phase separation. This mode of co-solvent removal enables scalable fabrication under ambient conditions. Several aspects of the VIPS process distinguish it from both STRIPS and the conventional bijel fabrication meth-od. As will be demonstrated, VIPS allows control over domain sizes by varying the quenching rate which can be controlled by changing the co-solvent evaporation rate. Furthermore, secondary phase separation can be induced to produce hierarchical structure-in-structure morphologies. Moreover, we identify a new pathway to produce bicontinuous structures via partial coalescence of particle-stabilized droplets. These unique features make VIPS a highly versatile and flexible method to produce large-area hierarchical particle-stabilized biphasic films, coatings and membranes via scalable manufacturing processes such as spray and blade coating. The hierarchical bijels prepared via VIPS enable new applications of liquid composites in advanced applications including filtration and catalysis as well as functional coatings and skincare/home-care products.

In vaporization-induced phase separation (VIPS), a homogeneous ternary mixture is applied onto a substrate to form a film under an ambient condition by means of spraying or blade coating. The ternary mixture is prepared by mixing two immiscible liquids (e.g., oil and water) and a co-solvent. An example of a VIPS system is shown in FIGS. 19A-19C. Similar protocols are followed for the formation of VIPS bijels from spread precursor solutions as in STRIPS.

UV irradiation can be applied to photopolymerize the oil phase which comprises 1,6-hexanediol diacrylate (HDA). This process leads to a white opaque film with great mechanical robustness which can be detached from the substrate by immersion in ethanol to form a free-standing film as shown in FIG. 19D. Applications of VIPS structures can involve solidified materials; we focus here on the polymerized VIPS structures. However, we note that VIPS structures in the liquid state can be prepared and could have interesting applications on their own right. A fluorescent dye, Nile Red, originally added to the homogeneous ternary mixture, partitions to the oil phase upon phase separation and remains trapped in the oil phase upon polymerization, facilitating visualization under confocal microscopy.

Figures 20A, 20B, 20C, 20D, 20E:
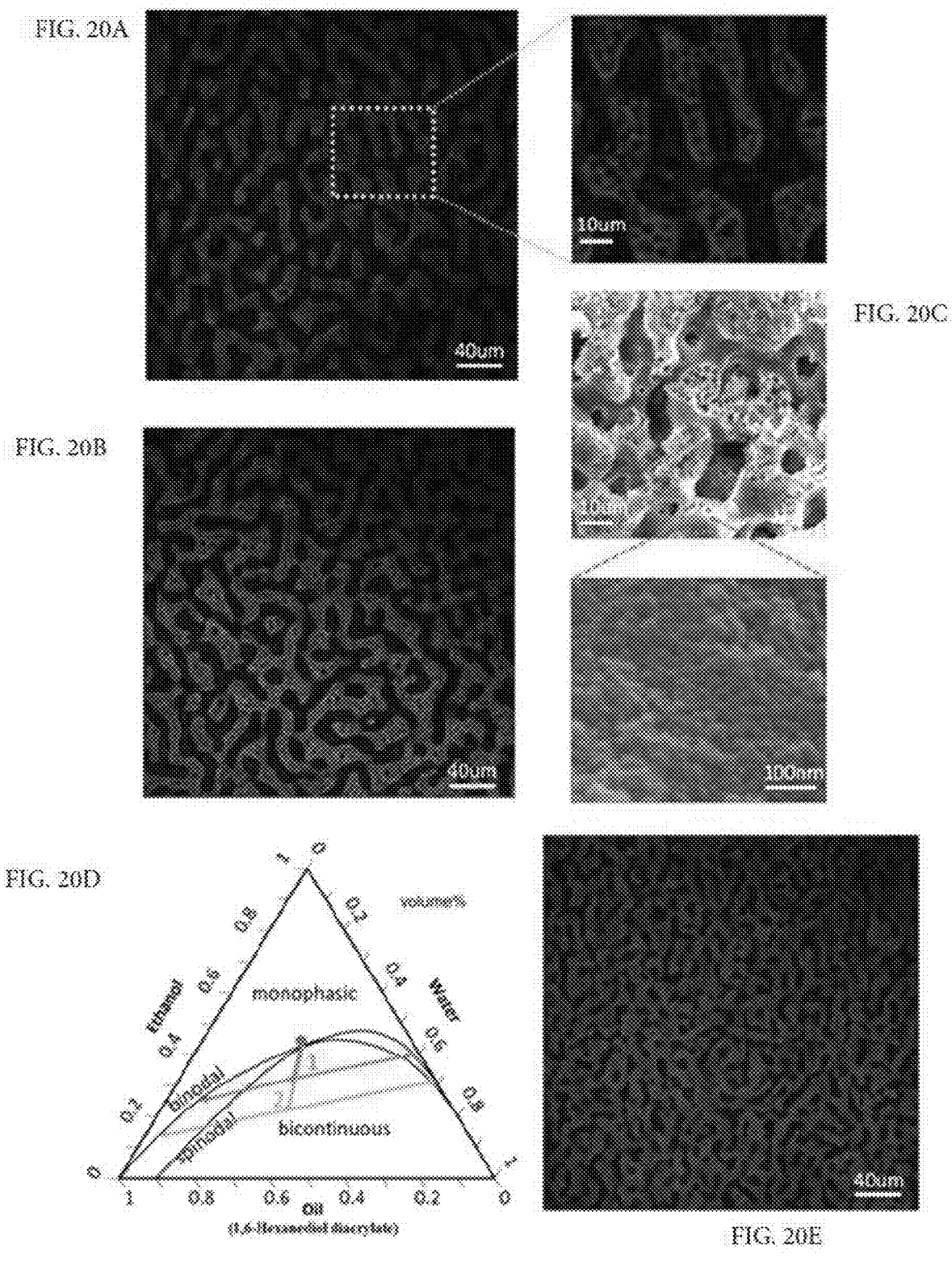
FIGS. 20A-20E provides confocal and SEM images of polymerized VIPS films. The green domains (Nile Red) are the polymerized HDA phase and the dark domains are the regions previously filled with water.

To form a VIPS bijel, we set the initial composition of the homogeneous mixture close to the critical point, as shown in FIG. 19A. The subsequent evaporation and removal of ethanol changes the composition as indicated by the arrow in the ternary phase diagram, into the biphasic region, inducing spinodal decomposition. Jamming of nanoparticles at oil-water interface stabilizes the structure, as shown in FIG. 20C (inset). We polymerize the oil phase and immerse the polymerized sample in an index-matched medium (diethyl phthalate (DEP)) to facilitate confocal microscopy. FIGS. 20A-20B show confocal images of VIPS films from two slightly different initial compositions. In these images, the green phase is the polymerized oil phase and the dark phase shows the channels that were previously filled with the water phase. Unlike STRIPS, which involves simultaneous removal of co-solvent and uptake of water during phase separation, VIPS does not result in uptake of water, but rather relies on the evaporation of co-solvent. Since co-solvent (ethanol) evaporates far more rapidly than water, the volumetric ratio of oil/water phases in the VIPS bijel structures are controlled by the initial composition. Therefore, by changing the oil/water ratio in the homogeneous mixture, the ratio of the two phases in the final structure can be controlled. By increasing the oil/water ratio in the original mixture from 1.2 to 1.5, the structure with more densely distributed oil phase, for example, is produced as shown in FIGS. 20A and 20B.

In addition to varying the oil/water ratio, it is possible to change the structure of the phase separated mixture via VIPS by manipulating the evaporation rate of ethanol. This evaporation rate can be regulated by flowing air over the sample (i.e. parallel to the film) at a controlled flow rate. In our experiments, the airflow accelerates the evaporation of ethanol by a factor of roughly 10, leading to significantly smaller domain sizes (FIG. 20E), compared to those prepared without airflow but with the same initial composition (FIG. 20B).

Without being bound to any particular theory, the rate of ethanol removal affects the quenching depth, as qualitatively illustrated in FIG. 20D. Paths 1 and 2 represent changes in the composition of the mixture upon slow and fast evaporation, respectively. In the latter case, the mixture is quenched more deeply into the spinodal region of the phase diagram when it starts to undergo phase separation. Compared to the mixture that follows Path 1, greater compositional difference between the two emerging phases is achieved in Path 2. The resulting interfacial tension between the two phases would be higher in Path 2 than in Path 1. Such a difference can promote faster and stronger attachment of nanoparticles at interfaces and subsequently induces jamming of particle earlier in the phase separation process, resulting in smaller domains.

More interestingly, the VIPS process results in the formation of hierarchical bicontinuous structures within the phase separated domains. The manipulation of quenching rate provides a means to control the sizes of primary and sub-domains.

As shown in FIG. 20A (inset), inside the oil-rich domains, we observe the existence of water-rich subdomains. The presence of these subdomains is also confirmed by SEM image of polymerized VIPS films as shown in FIG. 20C. This structure-in-structure is achieved by limiting the evaporation of ethanol, as represented by Path 1. Upon removal of ethanol, the mixture enters the spinodal region of the phase diagram and undergoes phase separation. A considerable amount of ethanol and water exist in the oil-rich phase as shown by the tie line as illustrated in Path 1 of FIG. 20D. Ethanol continues to evaporate from the oil-rich phase and undergoes secondary phase separation inside the oil domains. These subdomains likely become stabilized by attachment and interfacial jamming of nanoparticles. Similar subdomains likely form in the water-rich domains due to continued loss of ethanol. While secondary phase separation has been reported previously in a ternary phase separating droplet system in the absence of nanoparticles, resulting in multiple emulsion droplets, the hierarchical structures formed in our system are bicontinuous, as discussed further below. The presence of these sub-domains in the hierarchical bijels increases the surface area and provides compartments for encapsulation of actives, making VIPS structures attractive for catalysis and drug delivery applications, respectively.

Their bicontinuous morphology makes bijels attractive in fields including continuous reactive separations and energy conversion and storage devices. The structural integrity of the polymerized VIPS structures indicates that the oil phase is continuous.

To verify the continuity of the water phase, we conduct a dye permeation experiment. As shown in FIG. 21A, a dry polymerized VIPS film is immersed in diethyl phthalate (DEP) to achieve refractive index matching. Another fluorescent dye, 9,10-bis(phenylethynyl)anthracene (BPA), with different emission-spectra than Nile red is added to the outer DEP phase.

Within 10 minutes, channels previously filled by the water phase are filled by BPA-solubilized DEP; the dye reveals a continuous network exclusive to the green polymer phase, suggesting that the water-rich domains are indeed continuous.

Since the thickness of film is much smaller than the other 2 dimensions, mass transport occurs rapidly across the film thickness. To more convincingly probe the continuity of water-rich domains in the plane of the structure (i.e. the x-y plane in FIG. 21B), a polymerized VIPS film is placed as a bridge from one plate to the other. A droplet of BPA-containing DEP is placed on one plate, which forms a dye front that permeates through the water-rich domains. This permeating front is observed via confocal microscopy focused on the other plate, further confirming the continuity of the water-rich domain of the VIPS structure. The dye permeation experiment also confirms that BPA-containing DEP fills the subdomains as shown in FIG. 21C, verifying that the water-rich subdomains within the oil-rich domains are connected to the primary water-rich domains although they look like droplets that formed via nucleation and growth; that is, all water domains are continuous.

Figures 22A, 22B, 22C, 22D, 22E, 22F:
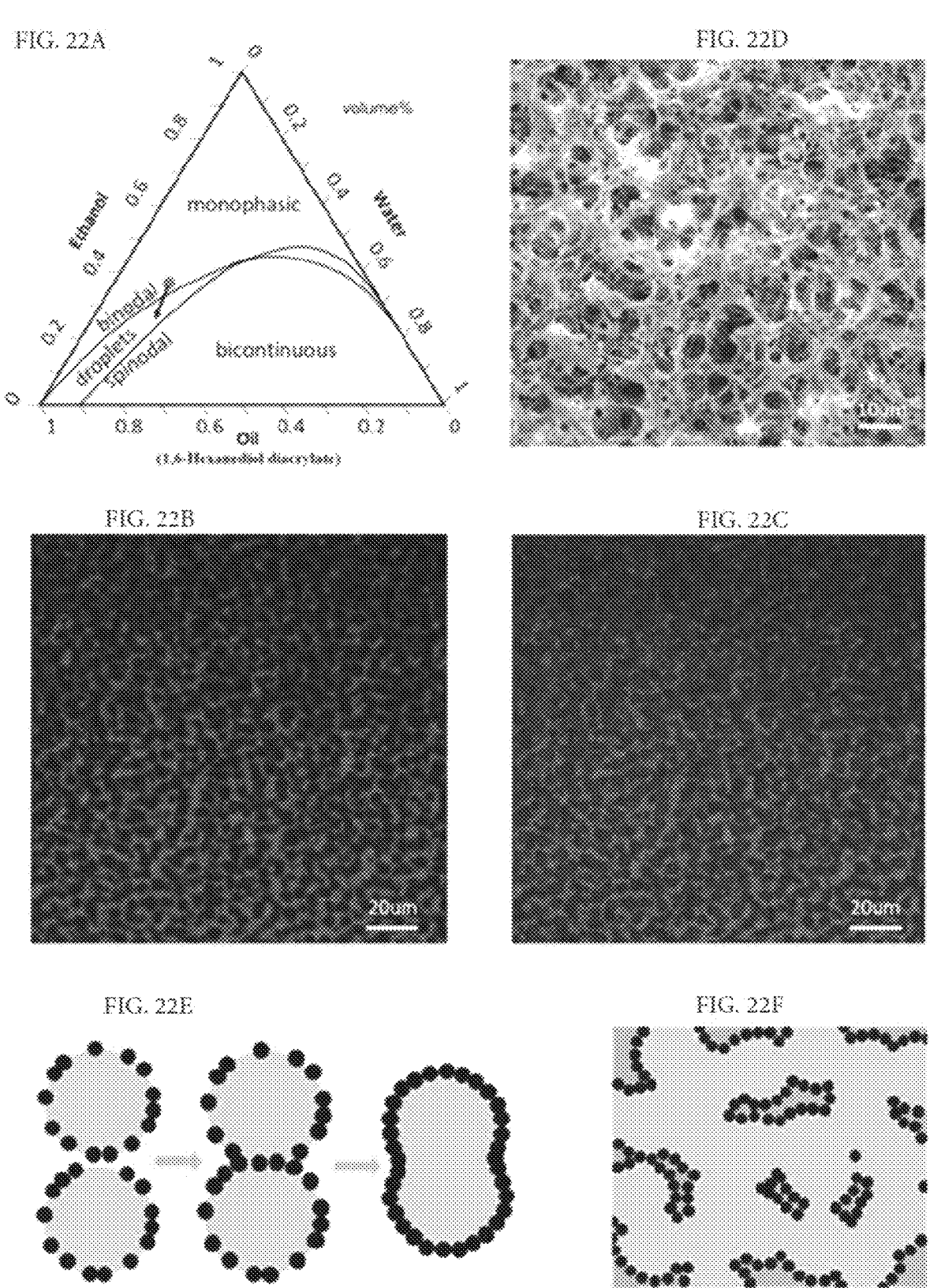
FIGS. 22A-22F provide a bicontinuous VIPS structure via partial coalescence of water droplets that are incompletely covered by nanoparticles (FIG. 22A) A homogeneous pre-cursor mixture that has composition away from critical point represented by the light blue point is quenched into the meta-stable region upon evaporation of ethanol.

To further explore the potential of VIPS, we characterize the structures that emerge when the initial composition is adjusted such that quenching does not occur through the critical point in the phase diagram. As shown in FIG. 22A, evaporation of ethanol from this off-critical point composition should move the composition of the mixture into the meta-stable region and induce nucleation and growth of water phases to form Pickering emulsions via phase separation. However, the resulting structures can depend on the initial conditions and the amount of particles in the system. For example, a particularly interesting VIPS film is polymerized and imaged using a confocal microscope as shown in FIG. 22B. The dark phase which represents the water phase seems to have formed discrete domains via nucleation and growth. However, when these samples are subjected to the dye permeation experiment as described above, the dye readily and fully penetrates all of the water-rich domains indicating that these seemingly discrete domains are, in fact, continuous. The continuity of the water phase is further confirmed by SEM microscopy as shown in FIG. 22D. The external oil phase in the system is also continuous.

Without being bound to any particular theory, one may find that the bicontinuity in this VIPS structure is achieved by partial coalescence of water droplets that are incompletely covered by nanoparticles. Prior studies on Pickering emulsions have shown that droplets partially covered by particles can undergo partial coalescence, as schematically illustrated in FIG. 22E. The jamming of particles upon coalescence of two droplets impedes relaxation of the interface into one spherical droplet, so that a non-spherical structure, resembling a dumbbell, is formed.

Multiple droplets can also undergo similar partial coalescence. In the VIPS process involving nucleation and growth, many water-rich droplets that form via nucleation and growth can undergo arrested merging; this process is facilitated by the volumetric contraction of mixture due to co-solvent evaporation, leading to the percolating structure as illustrated in FIG. 22F.

To rule out the possibility that BPA is able to penetrate the polymerized oil phase and reach isolated domains, a sample with discrete domains (i.e. a Pickering emulsion) is intentionally fabricated with isolated water domains via nucleation and growth (see elsewhere herein for details on the fabrication of samples with isolated water domains); this structure is subsequently polymerized and immersed in both ethanol and DEP for 12 hours to enable refractive index-match. The sample is transferred to BPA-solubilized DEP for the permeation test. Even after 3 hours, no penetration of BPA into the dark domains is observed, indicating the crosslinked polymer phase is highly impermeable to BPA. Notably, while we focus on the formation of bicontinuous biphasic structures, these results also demonstrate that Pickering emulsions can be formed via VIPS. Biphasic bicontinuous structures have also been fabricated by arrested coalescence of shear-induced droplets by nanoparticle-polymer complexes or by direct mixing of viscous binary mixture containing nanoparticles and surfactants. In particular, our results resemble the structures formed in ref 32, although we arrive at these structures from differing processes.

The "standard" VIPS process in this research relies on blade coating, which facilitates the formation of a uniform and initially homogeneous film of the precursor solution on the surface. Other coating techniques can be used, however.

Figures 23A, 23B:
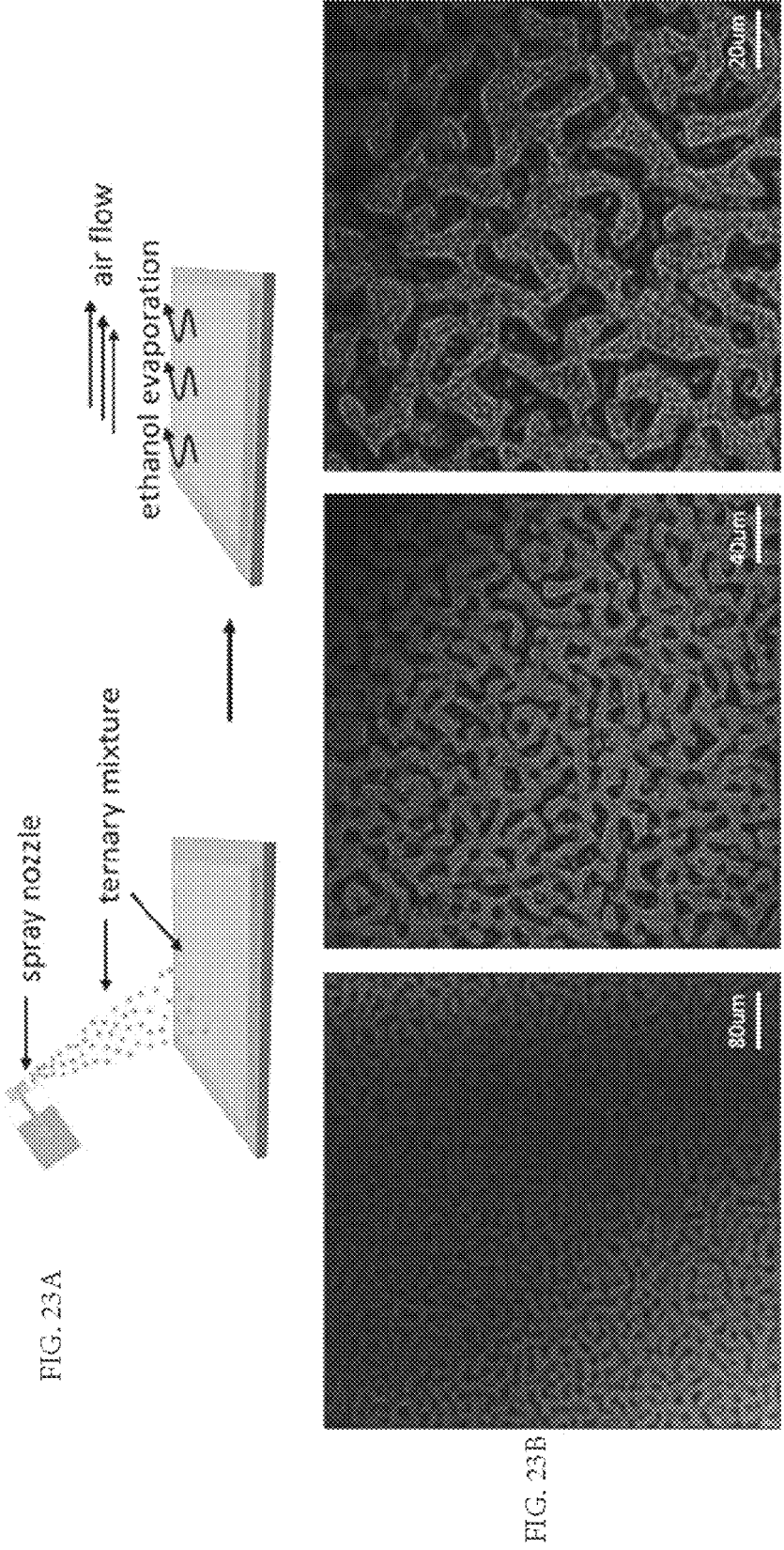
FIG. 23A-23B provides VIPS films via spray fabrication.

To facilitate the formation of uniform films of the precursor solution via spray coating, we added extra ethanol (5%) to the precursor solution, which lowers the viscosity of the solution, and ensures the formation of homogeneous precursor films that have not yet phase separated. Without being bound to any particular theory, one may believe that insufficient ethanol evaporation occurs to initiate phase separation in the sprayed droplets as they travel through the air prior to landing on the surface. Once the film is formed on the surface, the overall mechanism of structure formation via vaporization of ethanol is likely to be similar in the two cases. Thus, we do not expect significant differences in the morphology of the bijels formed via the two coating methods. The morphology of spray-coated VIPS bijel is indeed similar to the samples made via blade-coating, as shown in FIG. 23B.

In summary, we have demonstrated a new method to fabricate bijels under ambient conditions by vaporization-induced phase separation (VIPS), which is conducive to scalable manufacturing methods such as spray application or blade coating. By controlling the evaporation rate of ethanol, the domain size of the VIPS structure can be controlled, and hierarchical bijels-in-bijels can be fabricated. In addition to relying on spinodal decomposition, a new pathway that takes advantage of partial coalescence of droplets that form via nucleation and growth to produce bicontinuous structures is introduced. The fact that bijels can be fabricated without spinodal decomposition greatly relaxes the compositional requirement and widens the composition of the bijels that can be prepared for broad applications. Although we focused on producing films to facilitate characterization, other forms of bicontinuous VIPS structures such as particles and fibers can be fabricated by means of spray drying or electrospinning, respectively. Without being bound to any particular theory, these highly tunable structures with high surface area, structural hierarchy, and high particle loading greatly expand the applications of bijels when combined with greatly simplified and potentially scalable fabrication process that can be performed under ambient conditions.

Experimental

The following experimental information is illustrative only and does not limit the scope of the present disclosure or the appended claims.

The ternary mixture has 6 main components: (1) 1,6-hexanediol diacrylate (HDA), (2) $50_{wt}\%$ silica nanoparticle suspension (concentrated Ludox TMA in water, 22 nm, pH 3), (3) 200 mM cetyl trimethyl ammonium bromide (CTAB) solution in ethanol, (4) pH 3 adjusted water, (5) pure ethanol, (6) 2-hydroxy-2-methylpropiophenone (HMP) as photo-initiator. As an example, these components are mixed in the following sequence to prepare a precursor mixture. 9.78 g (1), 0.98 g (5), 8.30 g (3), 0.34 g (4), 12.10 g (2) and 0.13 g (6). The mixture is shaken or vortexed until it becomes transparent. Subsequently, the sample is kept in dark to prevent undesired polymerization induced by ambient light.

VIPS Film Formation

The precursor mixture is applied on glass slides and blade-coated with a gap of ~200 um at room temperature. Meanwhile, a venting pipe with a control valve is turned on to create airflow of different velocities ranging from 0 m/s to 15 m/s. The sample is irradiated with ultraviolet (UV) light ($340$ nm, 25 Wm$^{-2}$) to polymerize the HDA phase within 2 mins. The polymerized sample on a glass slide is placed in ethanol for 10 mins to make a freestanding film. For spray coating, a plastic container with a nozzle is used. The container is held ~50 cm above a glass slide and the precursor mixture is sprayed for 5 s. Subsequently, UV is applied, and the same procedure is followed to prepare a VIPS sample for further characterization.

Dye Permeation Experiment

Polymerized VIPS samples are immersed in DEP dyed with 9,10-bis(phenylethynyl)anthracene (BPA). After 30 mins, a confocal microscope is used to monitor the spreading of DEP in the channels between polymer phases. The excitation wavelength is set to be 488 nm. Samples are imaged using fluorescence channels adjusted for the two dyes: 500-530 nm for the dyed DEP phase and 625-725 nm for the polymer phase. In the x-y plane-continuity experiment, dried films are put across two disconnected cover slides. Dyed DEP is placed on one slide and the dye permeation in the film is monitored on the other slide via confocal microscopy.

Influence of Applied Airflow on the Evaporation of Ethanol

Pure ethanol is used to roughly estimate the evaporation rate of ethanol from ternary mixture under airflow. We let 20 g ethanol in plastic Petri dish evaporate under applied airflows of Om/s and 5 m/s, and the evaporation rate is measured as 0.054 g/min and 0.58 g/min, respectively. Therefore, the evaporation rate of ethanol is increased by a factor of 11.

Influence of Gradient of Quenching Depth

There is a gradient of quenching depth or ethanol loss in the direction normal to the air-film interface of VIPS film, which results in smaller domain sizes at the free surface, and larger domains toward the base of the film.

A VIPS film sample produced under conditions that do not form bicontinuous structures throughout the film thickness is shown; the bottom-most portion of the film is not bicontinuous. In contrast, a different sample with similar film thickness but a longer quenching time before polymerization retains its bicontinuous morphology even at the bottom of the sample. One can produce VIPS bijels films that retain bicontinuity through the entire thickness of the sample by controlling quenching time and rate.

Control Over Domain Size

Figures 24A, 24B:
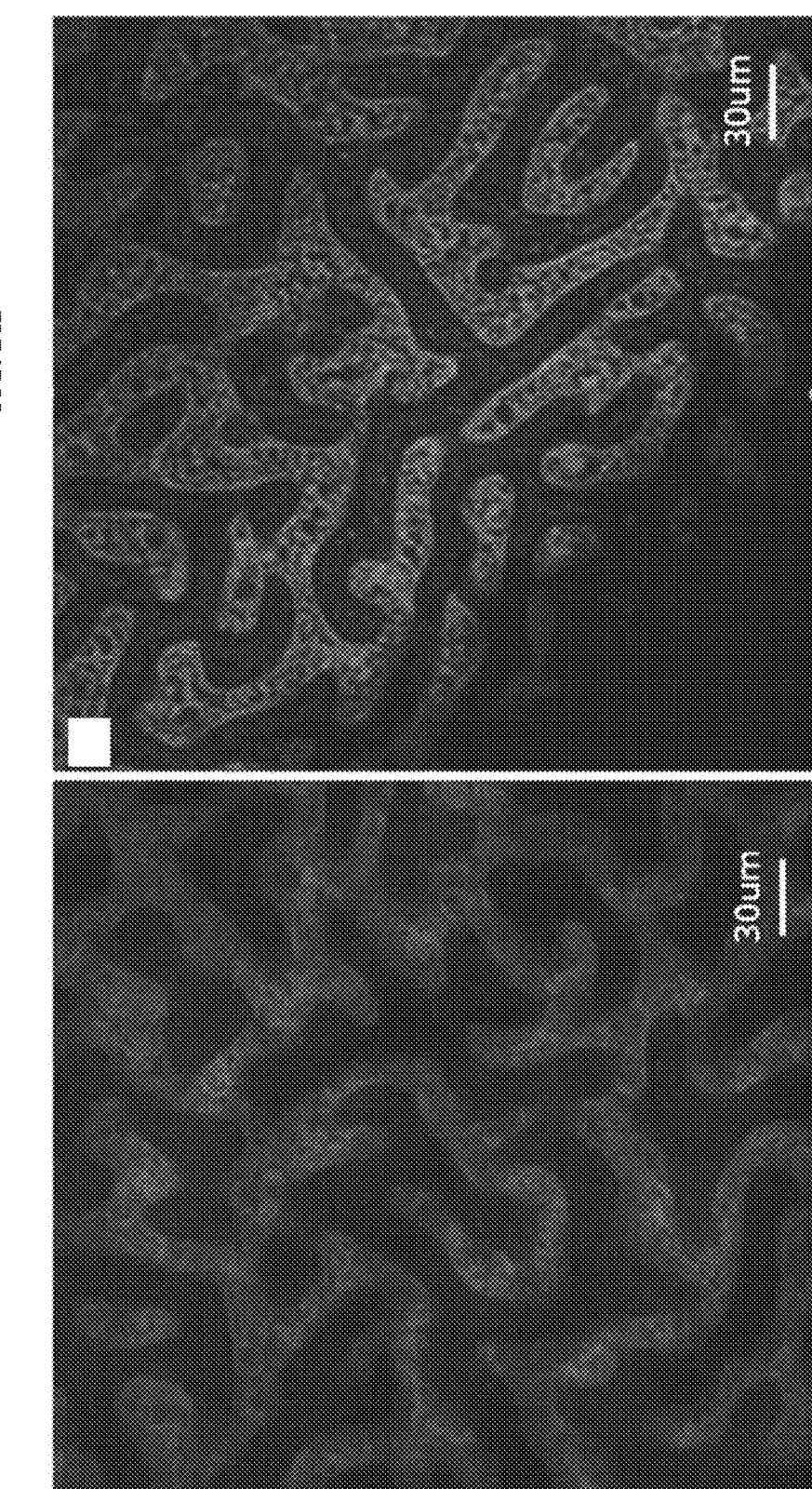
FIGS. 24A-24B provide an illustration of controlling domain size by varying ethanol evaporation rate and particle concentration.

In the VIPS method, control over the domain size is achieved by varying both the ethanol evaporation rate and the silica nanoparticle concentration. A higher nanoparticle concentration leads to smaller domains, whereas airflow accelerates the evaporation of ethanol, leading to deeper quenching and smaller domains. By regulating these two factors, the size of phase separated domains can be varied over a wide range. As shown in FIG. 24B, even with a higher nanoparticle concentration than (a), the domain size of (b) in the absence of airflow is similar to that observed in (a). By limiting airflow, the evaporation rate of ethanol in (b) is reduced, which offsets the effect of the increased nanoparticle concentration.

Determination of the Ratio of Oil/Water Phases in Polymerized VIPS Bijel Film.

Figures 25A, 25B:
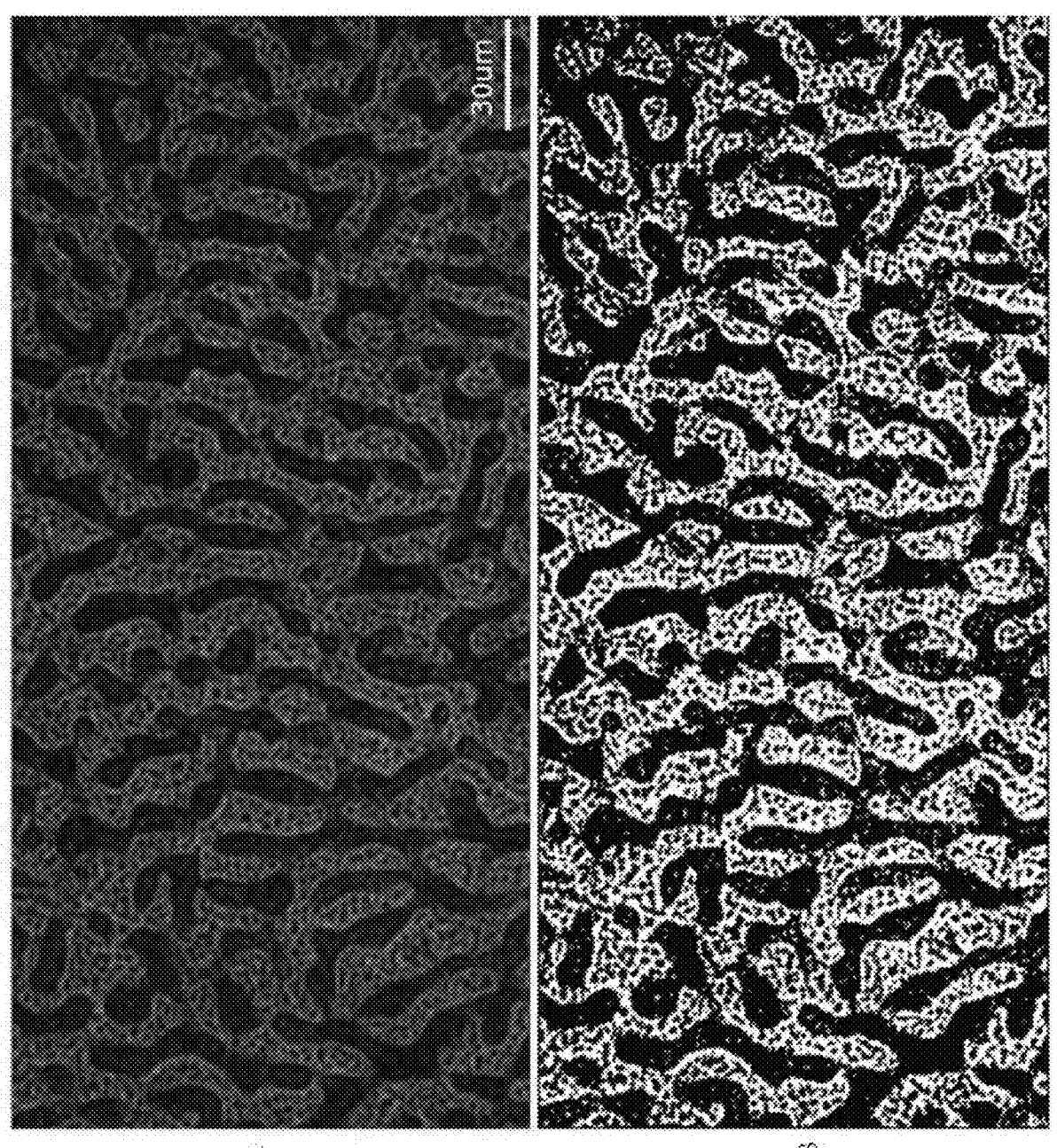
FIGS. 25A-25B provides an illustration of determination of volumetric ratio of oil/water phases in polymerized VIPS bijel.
Figure 26:
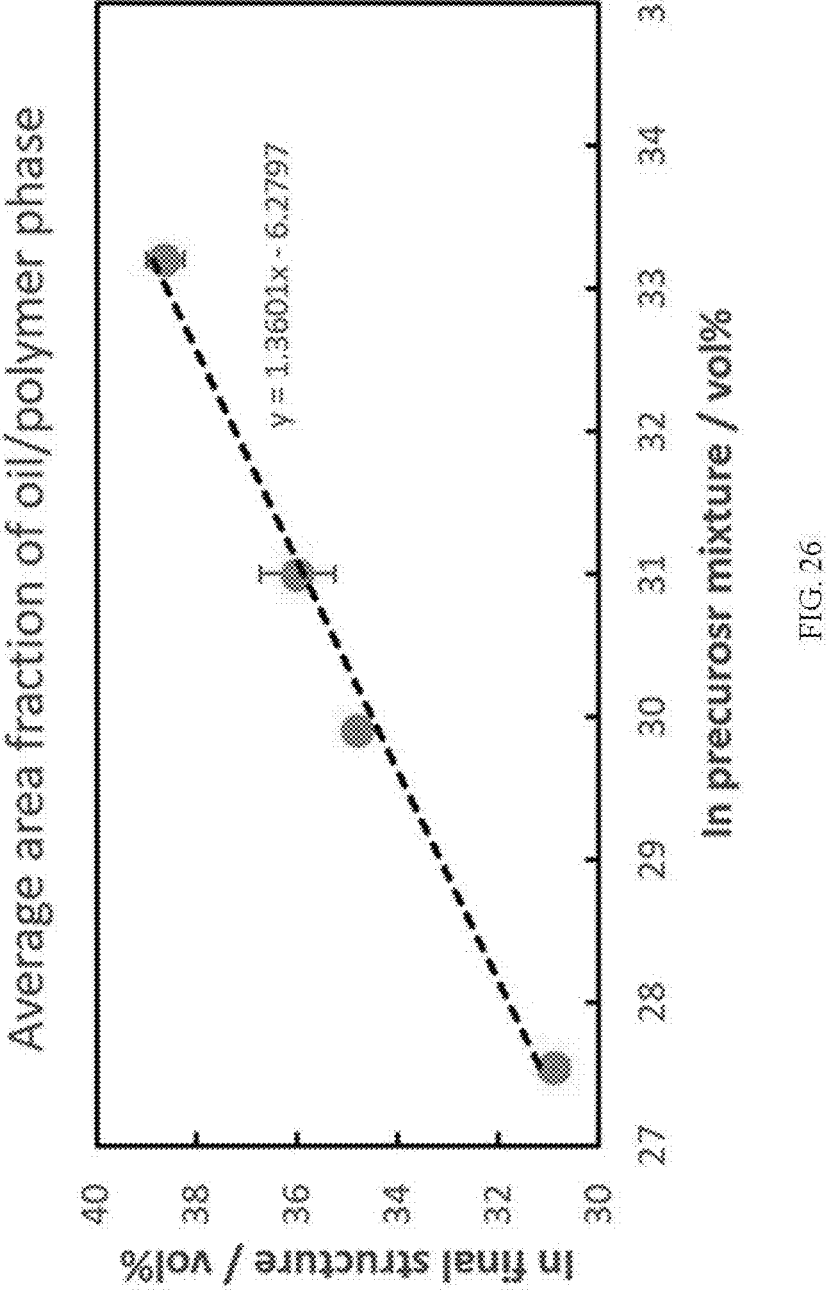
FIG. 26 provides an exemplary average area fraction of oil/poly(HDA) in precursor mixture versus in final structure. Error bars correspond to 3σ of 3 measurements.

The volumetric ratio of oil/water phases in a polymerized VIPS bijel can be estimated by the initial composition of the ternary mixture. Confocal microscopy images taken along the Z-direction of the VIPS bijel film are analyzed using ImageJ. A micrograph of the VIPS bijel film made with 31 v % HDA in the initial ternary mixture (including silica nanoparticles) is converted to a binary image using the threshold function as shown in FIGS. 25A-25B. This procedure is repeated for at least 3 different slices. The average area fraction of bright phase (poly(HDA)) is 36±2.03%. By removing ethanol from the system, the fraction of polymer phase increased when compared with that of the oil phase in the initial precursor mixture. Similarly, for VIPS films made with 27.55 v %, 29.9 v % and 33.2 v % HDA in the initial ternary mixture, the average area fraction of poly(HDA) increased to 30.9±0.96%, 34.81±0.69% and 38.63±0.93% in the final VIPS film, respectively. As shown in FIG. 26, within the window of bijel fabrication, the fitted line in simple linear regression indicates that the ratio of the two phases in the final VIPS structure is strongly correlated with the composition of the precursor mixture with a high degree of precision.

Determining the Continuity of Water-Rich Phase in the x-y Plane

Figure 27:
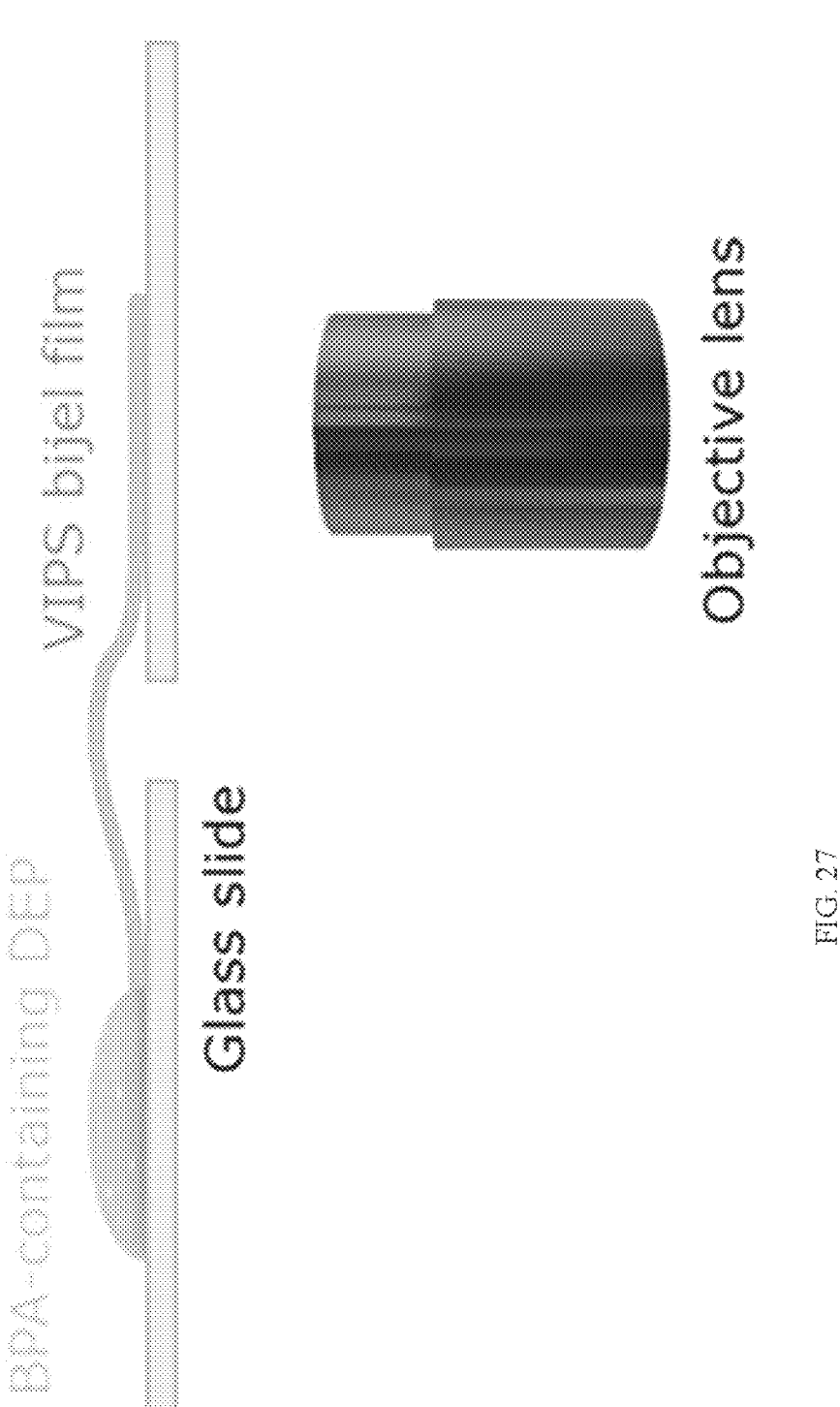
FIG. 27 provides an example dye permeation experiment set-up. In this set-up, a dried polymerized VIPS film is placed as a bridge from one plate to the other. A droplet of BPA-containing DEP is placed on one plate. The permeating front is observed on the other plate via confocal microscopy.

The set-up shown in FIG. 27 was used to determine the in-plane continuity of the water-rich domains in VIPS bijels. The film slice is curved upward to prevent any sliding of BPA-containing DEP through the top surface of the VIPS film. With this configuration, we ensure that any florescence detected on the imaging plane is due to dye migration from the other plate through the channels previously resided by the water-rich phase. Because of the refractive-index mismatch between polymer and air which induces scattering of laser, dry polymer phase cannot be visualized by confocal microscopy. Therefore, the florescence of poly(HDA) phase is also moving with the permeating front as DEP functions as both the solvent for BPA and the medium for index-matching.

Figures 28A, 28B, 28C:
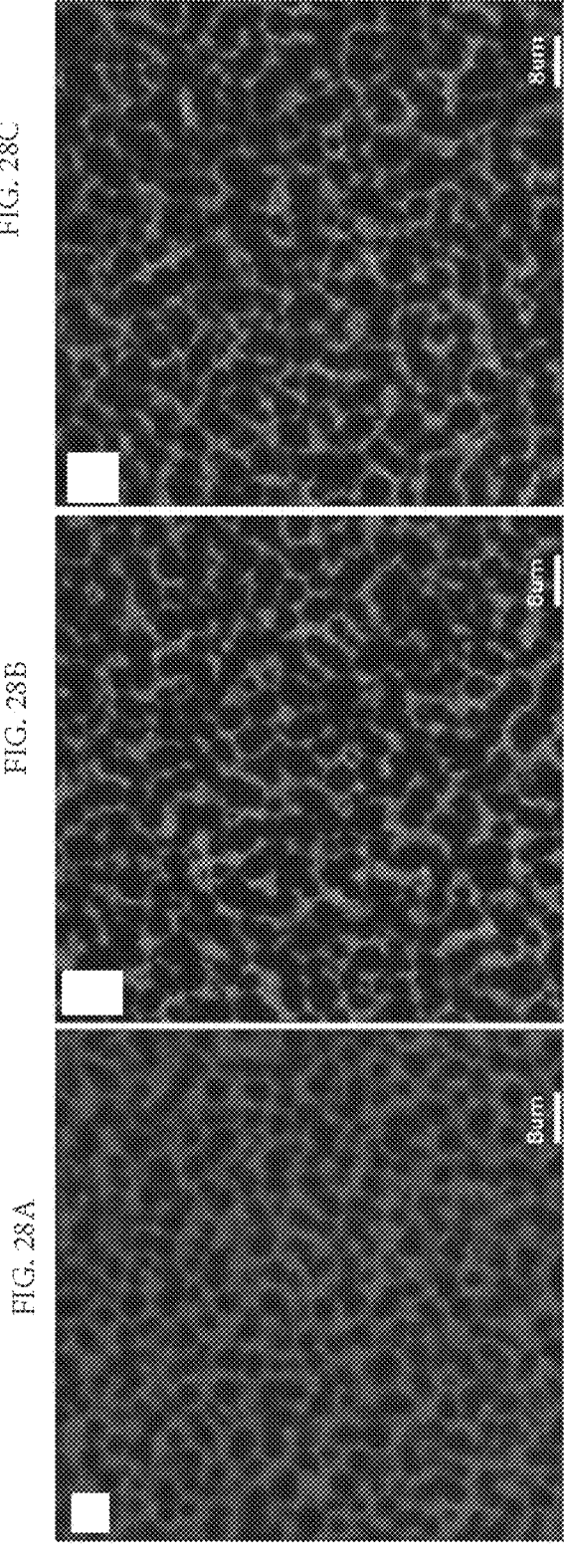
FIGS. 28A-28C illustrates the control over extent of droplet coalescence by varying evaporation time of ethanol before polymerization: Confocal microscope images of polymerized bijel via nucleation and growth after (FIG. 28A) 20 s, (FIG. 28B) 30 s and (FIG. 28C) 40 s of evaporation.
Figure 29:
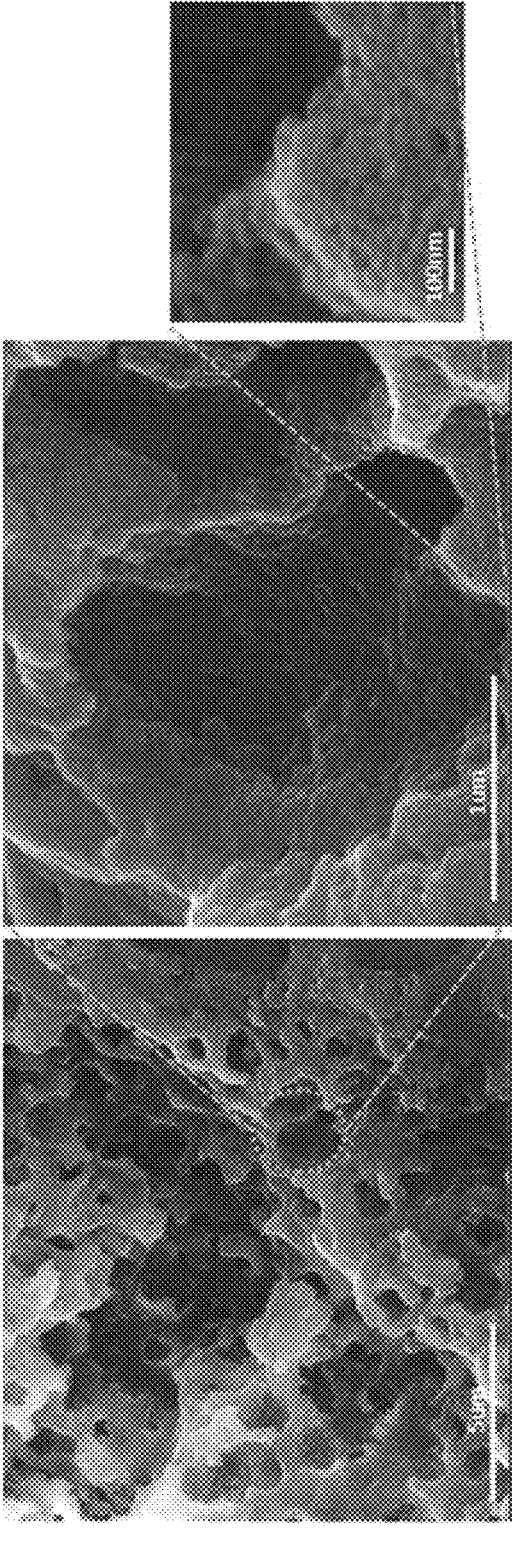
FIG. 29 provides SEM cross-sectional images of nucle-ation and growth-bijel film at different length scale: The insets contain magnifications of the fiber surfaces showing the interfacially jammed silica nanoparticles.

Arrested Coalescence of Water Droplets that are Partially Covered with Nanoparticles The structures of VIPS film formed via nucleation and growth are imaged by confocal microscopy. By increasing evaporation time of ethanol before polymerization, the previously isolated water domains undergo greater extent of coalescence as shown in FIG. 28A-28B. Without being bound to any particular theory, one may believe this arrested coalescence is achieved by both the growing of water droplets and the volumetric loss of the continuous oil-rich phase due to ethanol evaporation. From 30 s of evaporation to 40 s, no obvious change in the degree of merging is found as shown in FIG. 28B-28C which implies that coalescence is arrested, likely by jamming of nanoparticle at interface. This conclusion is further confirmed by SEM image of polymerized bijel formed via nucleation and growth showing the presence of jammed interfacial particles between two merging droplets as shown in FIG. 29.

Therefore, by limiting evaporation time of ethanol, VIPS structure with isolated water domains (i.e., Pickering emulsion) can be produced. Such a sample is used to determine the impermeability of DEP to polymerized oil phase by dye permeation experiment.

Exemplary Applications

Porous Materials

As described, materials with a bicontinuous structure and a bimodal pore size distribution provide for applications in catalysis, gas storage, and osmotic power. The idea is that combining interconnected pores at the nanometer and micrometer scales allows simultaneous optimization of active surface area and mass transport.

The small pores enhance the active surface area for adsorption and heterogeneous reactions, while the large pores facilitate the rapid flow of fluid reactants or macromolecular solutions. Such materials can be obtained from bijels by using the polymerized version as a template for nanocasting, generating micropores down to about 10 nm.

Such bicontinuous bimodal porous materials could also be excellent chemical sensors by using a responsive polymer either during or after the post-processing step.

Microfluidics

Bijels can be useful as cross-flow microreactors, in which two liquids are made to flow in opposite directions through the two separate channels, allowing intimate contact between mutually insoluble reagents. These reagents can meet at the interstices between the interfacial particles, which take up at most 90% of the liquid-liquid interface, so the particles pose a significant barrier for reagents or products only if they are of comparable size (a feature which can even be used for size selection). The set-up also purifies the reaction, as any reaction product that is soluble in either phase can be swept out continuously. This is in stark contrast to microreactor designs based on droplet emulsions, which have to run as batch processes as reagents and/or products can only be injected into/extracted from the dispersed phase by breaking the emulsion.

Fiber Scaffolds for Tissue Engineering

In the past decades, tissue engineering has emerged as a multidisciplinary field encompassing medicine, biology, and engineering in which researchers utilize various tools to fabricate tissue-like biological constructs. Such constructs can mimic the physiological environment including the structural, physical, and topographical features of the native tissues. In addition to the ultimate goal of replacing diseased and damaged organs in human body, engineered tissues can be used for diagnostic and therapeutic research. According to embodiments of the present invention, a fiber scaffold comprises a bijel of the present invention.

As an example, bijel fibers with a continuous internal water channel have great potentials to be used as fibrous scaffolds for cell growth because (i) their porous surface morphology offers many anchoring sites for cell attachment and (ii) their internal water channel combined with the porous walls could be used for the continuous supply of nutrients to promote cell growth.

Cosmetic and Food Compositions

The fibers can be utilized as novel components in skin care creams delivering essential oils or moisture to the skin. Both components can be encapsulated in the separate continuous compartments of the bijel fibers. Another cosmetic application includes haircare products, in which a dye and a bleach can be encapsulated separately but released simultaneously. Bijel fibers can contain equal phase volumes of oil and water and therefore encapsulate oil and water soluble components equally well. Moreover, since the bijel fiber has a bicontinuous structure it is stable against gravity, while droplet based cosmetics can be prone to sedimentation.

Edible bijel fibers can provide novel types of food with unusual textures or mouth feeling. Due to the bicontinuous particle stabilized nature of the fibers the texture or mechanical properties can be different from emulsion droplets, a major component of mayonnaise, whipped cream or ice cream. Changing the bicontinuous domain sizes can affect the mechanical properties and mouth feeling. According to particular embodiments, the bijel fibers can comprise food-grade oils (e.g., oleic acid, the major component of olive oil).

REFERENCES (1) Aveyard, R.; Binks, B. P.; Clint, J. H. Emulsions Stabilised Solely by Colloidal Particles. Advances in Colloid and Interface Science 2003, 100-102, 503-546.

(2) Chevalier, Y.; Bolzinger, M.-A. Emulsions Stabilized with Solid Nanoparticles: Pickering Emulsions. Colloids and Surfaces A: Physicochemical and Engineering Aspects 2013, 439, 23-34.

(3) Stratford, K. Colloidal Jamming at Interfaces: A Route to Fluid-Bicontinuous Gels. Science 2005, 309 (5744), 2198-2201.

(4) Haase, M. F.; Stebe, K. J.; Lee, D. Continuous Fabrication of Hierarchical and Asymmetric Bijel Microparticles, Fibers, and Membranes by Solvent Transfer-Induced Phase Separation (STRIPS). Adv. Mater. 2015, 27 (44), 7065-7071.

(5) Herzig, E. M.; White, K. A.; Schofield, A. B.; Poon, W. C. K.; Clegg, P. S. Bicontinuous Emulsions Stabilized Solely by Colloidal Particles. Nature Mater 2007, 6 (12), 966-971.

(6) Jansen, F.; Harting, J. From Bijels to Pickering Emulsions: A Lattice Boltzmann Study. Phys. Rev. E 2011, 83 (4), 046707.

(7) Galiano, F.; Andre´ Schmidt, S.; Ye, X.; Kumar, R.; Mancuso, R.; Curcio, E.; Gabriele, B.; Hoinkis, J.; Figoli, A. UV-LED Induced Bicontinuous Microemulsions Polymerisation for Surface Modification of Commercial Membranes—Enhancing the Antifouling Properties. Separation and Purification Technology 2018, 194, 149-160.

(8) Haase, M. F.; Grigoriev, D. O.; Möhwald, H.; Shchukin, D. G. Development of Nanoparticle Stabilized Polymer Nanocontainers with High Content of the Encapsulated Active Agent and Their Application in Water-Borne Anti-corrosive Coatings. Adv. Mater. 2012, 24 (18), 2429-2435.

(9) Witt, J. A.; Mumm, D. R.; Mohraz, A. Microstructural Tunability of Co-Continuous Bijel-Derived Electrodes to Provide High Energy and Power Densities. J. Mater. Chem. A 2016, 4 (3), 1000-1007.

(10) McDevitt, K. M.; Mumm, D. R.; Mohraz, A. Improving Cyclability of ZnO Electrodes through Microstructural Design. ACS Appl. Energy Mater. 2019, 2 (11), 8107-8117.

(11) Di Vitantonio, G.; Wang, T.; Haase, M. F.; Stebe, K. J.; Lee, D. Robust Bijels for Reactive Separation via Silica-Reinforced Nanoparticle Layers. ACS Nano 2019, 13 (1), 26-31.

(12) Zhang, W.; Fu, L.; Yang, H. Micrometer-Scale Mixing with Pickering Emulsions: Biphasic Reactions without Stirring. ChemSusChem 2014, 7 (2), 391-396.

(13) Crossley, S.; Faria, J.; Shen, M.; Resasco, D. E. Solid Nanoparticles That Catalyze Biofuel Upgrade Reactions at the Water/Oil Interface. Science 2010, 327 (5961), 68-72.

(14) Zhang, M.; Wei, L.; Chen, H.; Du, Z.; Binks, B. P.; Yang, H. Compartmentalized Droplets for Continuous Flow Liquid-Liquid Interface Catalysis. J. Am. Chem. Soc. 2016, 138 (32), 10173-10183.

(15) White, K. A.; Schofield, A. B.; Binks, B. P.; Clegg, P. S. Influence of Particle Composition and Thermal Cycling on Bijel Formation. J. Phys.: Condens. Matter 2008, 20 (49), 494223.

(16) Sanz, E.; White, K. A.; Clegg, P. S.; Cates, M. E. Colloidal Gels Assembled via a Temporary Interfacial Scaffold. Phys. Rev. Lett. 2009, 103 (25), 255502.

(17) Cates, M. E.; Clegg, P. S. Bijels: A New Class of Soft Materials. Soft Matter 2008, 4 (11), 2132.

(18) Tavacoli, J. W.; Thijssen, J. H. J.; Schofield, A. B.; Clegg, P. S. Novel, Robust, and Versatile Bijels of Nitromethane, Ethanediol, and Colloidal Silica: Capsules, Sub-Ten-Micrometer Domains, and Mechanical Properties. Adv. Funct. Mater. 2011, 21(11), 2020-2027.

(19) Bai, L.; Fruehwirth, J. W.; Cheng, X.; Macosko, C. W. Dynamics and Rheology of Nonpolar Bijels. Soft Matter 2015, 11 (26), 5282-5293.

(20) Lee, M. N.; Mohraz, A. Hierarchically Porous Silver Monoliths from Colloidal Bicontinuous Interfacially Jammed Emulsion Gels. J. Am. Chem. Soc. 2011, 133 (18), 6945-6947.

(21) Lee, M. N.; Mohraz, A. Bicontinuous Macroporous Materials from Bijel Templates. Adv. Mater. 2010, 22 (43), 4836-4841.

(22) Marto, J.; Ascenso, A.; Gongalves, L. M.; Gouveia, L. F.; Manteigas, P.; Pinto, P.; Oliveira, E.; Almeida, A. J.; Ribeiro, H. M. Melatonin-Based Pickering Emulsion for Skin's Photoprotection. Drug Delivery 2016, 23 (5), 1594-1607.

(23) Haase, M. F.; Jeon, H.; Hough, N.; Kim, J. H.; Stebe, K. J.; Lee, D. Multifunctional Nanocomposite Hollow Fiber Membranes by Solvent Transfer Induced Phase Separation. Nat Commun 2017, 8 (1), 1234.

(24) Srivastava, R.; Choi, M.; Ryoo, R. Mesoporous Materials with Zeolite Framework: Remarkable Effect of the Hierarchical Structure for Retardation of Catalyst Deactivation. Chem. Commun. 2006, No. 43, 4489.

(25) Sun, Q.; Dai, Z.; Meng, X.; Xiao, F.-S. Porous Polymer Catalysts with Hierarchical Structures. Chem. Soc. Rev. 2015, 44 (17), 6018-6034.

(26) Parlett, C. M. A.; Wilson, K.; Lee, A. F. Hierarchical Porous Materials: Catalytic Applications. Chem. Soc. Rev. 2013, 42 (9), 3876-3893.

(27) Lee, M. N.; Santiago-Cordoba, M. A.; Hamilton, C. E.; Subbaiyan, N. K.; Duque, J. G.; Obrey, K. A. D. Developing Monolithic Nanoporous Gold with Hierarchical Bicontinuity Using Colloidal Bijels. J. Phys. Chem. Lett. 2014, 5 (5), 809-812.

(28) Haase, M. F.; Brujic, J. Tailoring of High-Order Multiple Emulsions by the Liquid-Liquid Phase Separation of Ternary Mixtures. Angew. Chem. Int. Ed. 2014, 53 (44), 11793-11797.

(29) Hong, Y.; Chen, X.; Jing, X.; Fan, H.; Guo, B.; Gu, Z.; Zhang, X. Preparation, Bioactivity, and Drug Release of Hierarchical Nanoporous Bioactive Glass Ultrathin Fibers. Adv. Mater. 2010, 22 (6), 754-758.

(30) Hu, C.; Cui, W. Hierarchical Structure of Electrospun Composite Fibers for Long-Term Controlled Drug Release Carriers. Advanced Healthcare Materials 2012, 1 (6), 809-814.

(31) Studart, A. R.; Shum, H. C.; Weitz, D. A. Arrested Coalescence of Particle-Coated Droplets into Nonspherical Supracolloidal Structures t. J. Phys. Chem. B 2009, 113 (12), 3914-3919.

(32) Huang, C.; Forth, J.; Wang, W.; Hong, K.; Smith, G. S.; Helms, B. A.; Russell, T. P. Bicontinuous structured liquids with sub-micrometre domains using nanoparticle surfactants. Nature nano-technology 2017, 12 (11), 1060-1064.

(33) Cai, D.; Clegg, P. S.; Li, T.; Rumble, K. A.; Tavacoli, J. W. Bijels formed by direct mixing. Soft matter 2017, 13 (28), 4824-4829.

(34) Stratford et al., Science, 2005, 309, 2198.

(35) Haase, M., et al., Angew. Chem. International Edition, 53, 44 (2014), 11793.

(36) Weitz, D., et al., J. of Physical Chemistry B, 113, 12 (2009), 3914.

What is claimed:

1. A system, comprising:

a dispenser configured to dispense a ternary mixture of a hydrophilic phase, an organic phase, and a co-solvent, the ternary mixture further having a plurality of particles disposed therein, the dispenser configured to controllably dispense the ternary mixture onto a substrate, the dispenser comprising therein an amount of the ternary mixture, the ternary mixture configured such that evaporation of the co-solvent into an environment exterior to the ternary mixture gives rise to (1) a phase separation that forms an interface between the hydrophilic phase and the organic phase, and (2) an assembly of at least some of the plurality of particles at the interface, the assembly arresting the phase separation and the evaporation giving rise to a multiphasic three-dimensional structure, and the multiphasic three-dimensional structure defining a plurality of domains therein.

2. The system of claim 1, further comprising an environmental chamber configured so as to contain a substrate onto which the dispenser has dispensed the ternary mixture.

3. The system of claim 2, wherein the environmental chamber is configured to modulate a temperature within the environmental chamber, a humidity within the environmental chamber, or both.

4. The system of claim 1, further comprising a heater configured to heat the substrate.

5. The system of claim 1, further comprising a supply of the substrate.

6. A system, comprising:

a dispenser configured to dispense a ternary mixture of a hydrophilic phase, an organic phase, and a co-solvent, the ternary mixture further having a plurality of particles disposed therein, the dispenser configured to controllably dispense the ternary mixture onto a substrate; and an environmental chamber configured so as to contain a substrate onto which the dispenser has dispensed the ternary mixture, the environmental chamber being configured to modulate a temperature within the environmental chamber, a humidity within the environmental chamber, or both.

7. The system of claim 6, further comprising a heater configured to heat the substrate.

8. The system of claim 6, wherein evaporation of the co-solvent gives rise to (1) a phase separation that forms an interface between the hydrophilic phase and the organic phase, and (2) an assembly of at least some of the plurality of particles at the interface, the assembly arresting the phase separation and the evaporation giving rise to a multiphasic three-dimensional structure that defines a plurality of discrete domains therein.

9. The system of claim 8, wherein the multiphasic three-dimensional structure is characterized as being a bicontinuous structure, a cellular structure, or a double-emulsion structure.

10. The system of claim 9, wherein the multiphasic three-dimensional structure is characterized as being a bicontinuous structure.

11. The system of claim 6, further comprising a supply of the substrate.

12. The system of claim 6, wherein (1) the system is configured for relative motion between the dispenser and the substrate, (2) the dispenser is configured as a sprayer, or both (1) and (2).

13. A system, comprising:

a dispenser configured to dispense a ternary mixture of a hydrophilic phase, an organic phase, and a co-solvent, the ternary mixture further having a plurality of particles disposed therein, the dispenser configured to controllably dispense the ternary mixture onto a substrate; and a heater configured to heat the substrate.

14. The system of claim 13, further comprising an environmental chamber configured so as to contain a substrate onto which the dispenser has dispensed the ternary mixture, the environmental chamber being configured to modulate a temperature within the environmental chamber, a humidity within the environmental chamber, or both.

15. The system of claim 13, wherein evaporation of the co-solvent gives rise to (1) a phase separation that forms an interface between the hydrophilic phase and the organic phase, and (2) an assembly of at least some of the plurality of particles at the interface, the assembly arresting the phase separation and the evaporation giving rise to a multiphasic three-dimensional structure that defines a plurality of discrete domains therein.

16. The system of claim 15, wherein the multiphasic three-dimensional structure is characterized as being a bicontinuous structure, a cellular structure, or a double-emulsion structure.

17. The system of claim 16, wherein the multiphasic three-dimensional structure is characterized as being a bicontinuous structure.

18. The system of claim 13, further comprising a supply of the substrate.

19. The system of claim 13, wherein the system is configured for relative motion between the dispenser and the substrate.

20. The system of claim 13, wherein the dispenser is configured as a sprayer.

* * * * *